US010389565B2

(12) United States Patent
Lin et al.

(10) Patent No.: US 10,389,565 B2
(45) Date of Patent: Aug. 20, 2019

(54) INTERLEAVING PROCESSING METHOD AND DEVICE IN OFMDA-BASED WLAN SYSTEM

(71) Applicant: Huawei Technologies Co., Ltd., Shenzhen, Guangdong (CN)

(72) Inventors: Wei Lin, Shenzhen (CN); Le Liu, Shenzhen (CN); Sergio Benedetto, Turin (IT); Guido Montorsi, Turin (IT); Weishan Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 15/594,185

(22) Filed: May 12, 2017

(65) Prior Publication Data
US 2017/0317868 A1  Nov. 2, 2017

Related U.S. Application Data

(63) Continuation of application No. PCT/CN2014/091146, filed on Nov. 14, 2014.

(51) Int. Cl.
*H04W 4/00* (2018.01)
*H04L 27/26* (2006.01)
(Continued)

(52) U.S. Cl.
CPC ........ *H04L 27/2608* (2013.01); *H04L 1/0042* (2013.01); *H04L 1/0071* (2013.01);
(Continued)

(58) Field of Classification Search
CPC . H04L 27/2608; H04L 1/0071; H04L 1/0042; H04L 47/34; H04L 27/26; H04L 1/04; H04W 72/04; H04W 84/12
(Continued)

(56) References Cited

U.S. PATENT DOCUMENTS 10,123,341 B2 *  11/2018  Kang ................ H03M 13/6527
2005/0160347 A1   7/2005  Kim et al.
(Continued)

FOREIGN PATENT DOCUMENTS

CN      1806392 A    7/2006
CN    101019340 A    8/2007
(Continued)

OTHER PUBLICATIONS

"IEEE Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput", IEEE Computer Society, LAN/MAN Standards Committee, IEEE Std 802.11n™-2009, Oct. 2009, 536 pages.
(Continued)

*Primary Examiner* — Chuong T Ho

(57) ABSTRACT

Embodiments of the present disclosure provide an interleaving processing method and device in a WLAN system. The apparatus includes: a bit parsing unit, configured to allocate bits in a coded data stream to n sub resource block interleaving units according to a specific sequence, where n is a positive integer greater than 1, and a value of n is a quantity of resource blocks allocated to the user; and the sub resource block interleaving units, configured to perform discrete interleaving on input bits. According to the foregoing apparatus and method, system performance can be improved.

18 Claims, 7 Drawing Sheets

(51) Int. Cl.
*H04L 12/801* (2013.01)
*H04W 72/04* (2009.01)
*H04L 1/00* (2006.01)
*H04W 84/12* (2009.01)
*H04L 1/04* (2006.01)

(52) U.S. Cl.
CPC .............. *H04L 27/26* (2013.01); *H04L 47/34* (2013.01); *H04W 72/04* (2013.01); *H04L 1/04* (2013.01); *H04W 84/12* (2013.01)

(58) Field of Classification Search
USPC .................................................. 370/329, 330
See application file for complete search history.

(56) References Cited

U.S. PATENT DOCUMENTS

| | | |
|---|---|---|
| 2007/0109956 A1 | 5/2007 | Kwon et al. |
| 2008/0049709 A1 | 2/2008 | Pan et al. |
| 2008/0095262 A1 | 4/2008 | Ho et al. |
| 2009/0175230 A1 | 7/2009 | Callard et al. |
| 2009/0249166 A1 | 10/2009 | Miki et al. |
| 2010/0074350 A1 | 3/2010 | Malladi et al. |
| 2010/0246527 A1* | 9/2010 | Montojo .................. H04L 5/005 370/330 |
| 2011/0134858 A1 | 6/2011 | Seo et al. |
| 2012/0076234 A1 | 3/2012 | Kim et al. |
| 2012/0230448 A1* | 9/2012 | Kang .................. H03M 13/6527 375/295 |
| 2015/0349995 A1* | 12/2015 | Zhang .................. H04L 5/0048 375/295 |
| 2015/0365195 A1* | 12/2015 | Yang .................. H04L 27/2634 375/295 |
| 2016/0073387 A1* | 3/2016 | Yang .................. H04L 5/0048 370/329 |
| 2016/0302213 A1* | 10/2016 | Kang ................ H03M 13/6527 |
| 2017/0325233 A1* | 11/2017 | Zhang .................. H04L 5/0041 |
| 2018/0006860 A1* | 1/2018 | Zhang .................. H04L 1/0057 |
| 2018/0234118 A1* | 8/2018 | Xi ..................... H03M 13/2707 |

FOREIGN PATENT DOCUMENTS

| | | |
|---|---|---|
| CN | 101247382 A | 8/2008 |
| CN | 101523788 A | 9/2009 |
| CN | 103986556 A | 8/2014 |
| WO | 2008084392 A2 | 7/2008 |

OTHER PUBLICATIONS

"IEEE Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz", IEEE Computer Society, LAN/MAN Standards Committee; IEEE Std 802.11ac™-2013, Dec. 2013, 425 pages.

Srinivasa et al., "11 ac 80MHz Transmission Flow", IEEE 802.11-10/0548r2, XP055409136, May 2010, 23 pages.

Stacey et al., "IEEE P802.11 Wireless LANs—Specification Framework for TGac", IEEE 802.11-09/0992r21, XP055409103, Jan. 2011, 49 pages.

* cited by examiner

INTERLEAVING PROCESSING METHOD AND DEVICE IN OFMDA-BASED WLAN SYSTEM

CROSS-REFERENCE TO RELATED APPLICATIONS

This application is a continuation of International Application No. PCT/CN2014/091146, filed on Nov. 14, 2014, the disclosure of which is hereby incorporated by reference in its entirety.

TECHNICAL FIELD

The present application relates to the field of communications technologies, and in particular, to an interleaving processing method and device in an OFMDA-based WLAN (Wireless Local Area Networks) system.

BACKGROUND

When communication is performed in a WLAN system, errors of transmitted information bits often occur serially. However, channel coding works only in a case of detecting and correcting a single error or a short string of errors.

To resolve the foregoing problem, an interleaving processing technology is used to process transmitted data bits. After the interleaving processing technology is used, consecutive transmitted data bits are scattered, and the transmitted data bits can be sent in a non-consecutive manner. In this way, even if a string of errors occurs in a transmission process, when a message of a successive bit string is restored, the errors become a single (or relatively short) error. In this case, the error is corrected by using a correction function of the channel coding, so that the original transmitted data bits can be restored more accurately.

In the 802.11a/g protocol, sub-interleaving processing needs to be performed on the transmitted data bits twice. In the 802.11n/ac/ah protocol, sub-interleaving processing needs to be performed three times. An interleaving processing parameter of any time of sub-interleaving processing may be determined according to a quantity of data subcarriers, that is, when the quantity of data subcarriers changes, the interleaving processing parameter also needs to change accordingly.

In addition, in the 802.11a/g/n/ac/ah protocol, an OFDM (Orthogonal Frequency Division Multiplexing) technology is used to perform data transmission. OFDM is a multi-carrier technology in which a frequency domain is divided into multiple mutually orthogonal data subcarriers, modulated signals that are corresponding to transmitted data bits and that are obtained after interleaving processing and modulation are respectively mapped to corresponding data subcarriers for transmission, and a quantity of data subcarriers is fixed.

To further improve transmission efficiency of a multi-user system, an orthogonal frequency division multiple access (OFDMA) technology is introduced into a next-generation WLAN standard. According to OFDMA, a transmission bandwidth is divided into a series of orthogonal subcarrier sets that do not overlap with each other, and different subcarrier sets are allocated to different orthogonal frequency division multiple access users, to achieve multiple access. Compared with the OFDM technology, an OFDMA system may dynamically allocate an available bandwidth resource to a user in need, thereby facilitating optimized utilization of system resources. Different subcarrier sets in each OFDM symbol are allocated to different users. Consequently, an original fullband interleaving solution causes data interleaving between different users, thereby affecting optimized user subcarrier allocation. Therefore, in the next-generation WLAN technology, an effective bit interleaving solution needs to be redesigned for a frequency band occupied by each user in the OFDMA system, to improve system performance with a lowest possibility of increasing system complexity.

SUMMARY

Embodiments of the present disclosure provide an interleaving processing method and device in a WLAN system, so as to improve system performance.

According to one aspect, an embodiment of the present disclosure provides an interleaving processing apparatus in a WLAN wireless local area network system, including: a bit parsing unit, configured to allocate bits in a coded data stream to n sub resource block interleaving units according to a specific sequence, where n is a positive integer greater than 1, and a value of n is a quantity of resource blocks allocated to the user; and the sub resource block interleaving units, configured to perform discrete interleaving on input bits.

According to another aspect, an embodiment of the present disclosure provides an interleaving processing method in a WLAN wireless local area network system, including: allocating, by a bit parsing unit, bits in a coded data stream to n sub resource block interleaving units according to a specific sequence, where n is a positive integer greater than 1, and a value of n is a quantity of resource blocks allocated to the user; and performing, by the sub resource block interleaving units, discrete interleaving on input bits.

Based on the foregoing technical solutions, according to the interleaving processing apparatus in an OFMDA-based WLAN system in the embodiments of the present disclosure, a bit parsing unit is configured to allocate bits in a coded data stream to n sub resource block interleaving units according to a specific sequence, and the sub resource block interleaving units are configured to perform discrete interleaving on input bits. A value of n is a quantity of resource blocks allocated to the user. According to the provided interleaving apparatus and method, a problem that a bit interleaver cannot be reused is resolved, and in addition, an interleaver based on this design has a more flexible length. When multiple RUs are allocated to a single user, the foregoing designed interleaving solution needs to have excellent performance, and be easy to implement.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
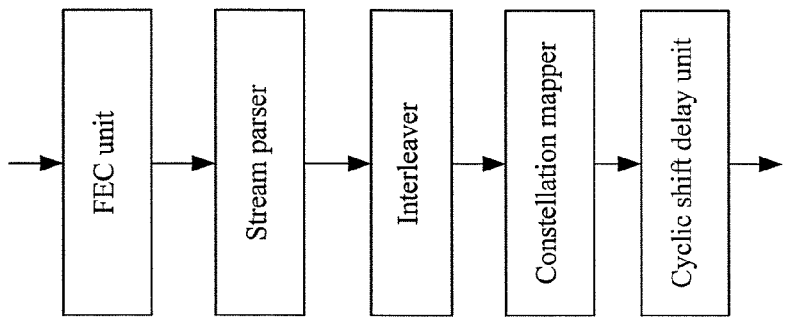
FIG. 1 is a block diagram of a BICM system in BCC based coding in an existing WLAN standard.

Currently, in the 802.11a/g/n/ac/ah standard, a system framework based on bit-interleaved coded modulation (BICM) is used. As shown in FIG. 1, one channel encoder, one stream parser, one bit interleaver, and one memoryless constellation mapper are serially cascaded. In a case of a fading channel, a BICM system increases a channel coding gain by using cascaded interleavers, thereby effectively improving system transmission reliability.

An existing WLAN standard combines OFDM and BICM technologies. Before OFDM modulation, an interleaving operation is performed on a channel coding bit sequence, to obtain a frequency domain coding diversity gain in a case of a wireless fading channel.

FIG. 1 is a block diagram of a BICM system in binary convolutional code (BCC) based coding in an existing WLAN standard. As shown in the figure, an interleaver is serially cascaded between a BCC encoder and a constellation mapper. The interleaver in the figure performs an interleaving operation on bits in OFDM symbols, to obtain frequency domain coding diversity. The system includes the following elements: a forward error control (FEC) unit, configured to perform a channel coding operation on data bits to obtain a data bit stream after channel coding; a stream parser (SP), configured to allocate the single bit stream in the FEC unit to iss spatial data streams; an interleaver, configured to perform an interleaving operation on each spatial data stream, where the interleaver may perform interleaving multiple times, for example, three times; a constellation mapper, configured to map an interleaved bit stream to constellation points in a modulation constellation diagram, to obtain a constellation symbol data stream; and a cyclic shift delay (CSD) unit, configured to perform a cyclic shift delay operation on each spatial data stream.

When BCC based coding is used, frequency domain interleaving processing needs to be performed. In the 802.11a/g standard, interleaving processing is performed twice. Because an MIMO (multiple-input multiple-output) technology is introduced into the 802.11n/ac/ah standard, interleaving processing needs to be performed three times. A method for two times of sub-interleaving processing performed in the 802.11a/g standard is the same as that for the first two times of sub-interleaving processing performed in the 802.11n/ac/ah standard.

To describe this solution more clearly, a method for performing three times of sub-interleaving processing in the 802.11n/ac/ah standard is first described simply.

Figure 2:
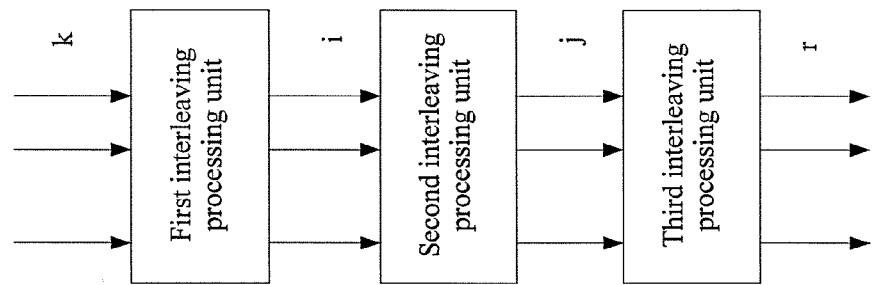
FIG. 2 is a schematic diagram of a first implementation manner of performing three times of sub-interleaving processing on to-be-transmitted data bits in the prior art.

As shown in FIG. 2, FIG. 2 is a schematic diagram of performing three times of sub-interleaving processing on to-be-transmitted data bits. A first interleaving processing unit is configured to map adjacent to-be-transmitted data bits to non-adjacent data subcarriers, where k represents an input location number of the first interleaving processing unit, i represents a corresponding output location number (or the input location number of the first interleaving processing unit) after the to-be-transmitted data bit passes through the first interleaving processing unit, and a mapping relationship between k and i may be:

$$i = N_{row}(k \bmod N_{COL}) + \left\lfloor \frac{k}{N_{COL}} \right\rfloor, k = 0, 1, \ldots, N_{CBPSSI} - 1,$$

where $N_{COL}$ and $N_{ROW}$ are known interleaving parameters for processing by the first interleaving processing unit; $N_{CBPSSI}$ is a quantity of input/output locations for processing by the first interleaving processing unit, $N_{CBPSSI}$ is equal to a value obtained by multiplying a quantity of data subcarriers by a modulation order, and $\lfloor \cdot \rfloor$ represents a round-down operation. It should be noted that both $N_{COL}$ and $N_{ROW}$ are determined according to the quantity of data subcarriers.

A second interleaving processing unit is configured to map adjacent coded bits to a least significant bit (LSB) and a most significant bit (MSB) in a constellation diagram in an interleaving manner, to prevent the coded bits from being continuously mapped to least significant bits, where i represents the output location number after the first time of interleaving by the first interleaving processing unit, and is also an input location number for processing by the second interleaving processing unit, j represents an output location number of the to-be-transmitted data bit after the to-be-transmitted data bit undergoes interleaving processing by the second interleaving processing unit, and a mapping relationship between i and j may be:

$$j = s \left\lfloor \frac{i}{s} \right\rfloor + \left(i + N_{CBPSSI} - \left\lfloor \frac{N_{COL} \cdot i}{N_{CBPSSI}} \right\rfloor\right) \bmod s, i = 0, 1, \ldots, N_{CBPSSI} - 1,$$

where $$s = \max(N_{CPSCS}/2, 1)$$

A third interleaving processing unit is configured to perform frequency rotation on other spatial flows, to lower a correlation between adjacent bits of different spatial flows, where j represents the output location number after interleaving processing by the second interleaving processing unit, and is also an input location number for interleaving processing by the third interleaving processing unit, and r represents an output location number of the to-be-transmitted data bit after the to-be-transmitted data bit undergoes interleaving processing by the third interleaving processing unit. If a quantity $N_{ss}$ of spatial flows is greater than or equal to 2 and less than or equal to 4, a mapping relationship between j and r may be:

$$r = \left\{ j - \left[ (2(i_{ss})) \bmod 3 + 3 \left\lfloor \frac{i_{ss}-1}{3} \right\rfloor \cdot N_{ROT} \cdot N_{BPSCS} \right] \right\} \bmod N_{CBPSSI},$$

$$j = 0, 1, \ldots, N_{CBPSSI} - 1, i_{ss} = 1, 2, 3 \ldots N_{ss},$$

where $N_{BPSCS}$ is a modulation order, and $N_{ROT}$ is a known interleaving parameter for interleaving processing by the third interleaving processing unit. If a quantity of spatial flows is greater than 4, a mapping relationship between j and r may be:

$$r = \{j - J(i_{ss}) \cdot N_{ROT} N_{BPSCS}\} \bmod N_{CBPSSI}, j = 0, 1, 2, \ldots$$
$$N_{CBPSSI} - 1, i_{ss} = 1, 2, 3 \ldots N_{ss}, \text{ where}$$

$J(i_{ss})$ is a stream bit cyclic shift coefficient in the foregoing formula, $i_{ss}$ is a sequence number of a spatial bit stream, a value of $J(i_{ss})$ is related to $i_{ss}$, and a relationship between $J(i_{ss})$ and $i_{ss}$ is shown in the following table:

| $i_{ss}$ | $J(i_{ss})$ |
|---|---|
| 1 | 0 |
| 2 | 5 |
| 3 | 2 |
| 4 | 7 |
| 5 | 3 |
| 6 | 6 |
| 7 | 1 |
| 8 | 4 |

In addition, as shown in the following table, relationships between different bandwidths and interleaving parameters may be:

| Parameter | 20 MHz | 40 MHz | 80 MHz |
|---|---|---|---|
| $N_{ROW}$ | 13 | 18 | 26 |
|  | $4 \times N_{BPSCS}$ | $6 \times N_{BPSCS}$ | $9 \times N_{BPSCS}$ |
| $N_{ROT}$ ($N_{SS} \leq 4$) | 11 | 29 | 58 |
| $N_{ROT}$ ($N_{SS} > 4$) | 6 | 13 | 28 |

$N_{COL}$ and $N_{ROW}$ are known interleaving parameters for processing by the first interleaving processing unit, $N_{ROT}$ is a block size coefficient of stream bit cyclic shift, and $N_{BPSCS}$ is a modulation order.

It should be noted that when bandwidths are different, quantities of data subcarriers may be different, and for a specific bandwidth, a quantity of data subcarriers is fixed. For example, when a bandwidth is 20 MHz, a quantity of data subcarriers may be 52; when a bandwidth is 40 MHz, a quantity of data subcarriers may be 108; and when a bandwidth is 80 MHz, a quantity of data subcarriers may be 234. The foregoing examples are not intended to limit the bandwidth and the quantity of data subcarriers, and the bandwidth and the quantity of data subcarriers may be set according to actual needs. Details are not described herein.

It should be noted that, an input location and an output location of each time of sub-interleaving processing are in a one-to-one correspondence in the foregoing implementation manner, but an implementation manner in which a one-to-one correspondence is not based on a sequence of input locations may be used. For example, as shown in FIG. 3, FIG. 3 is a schematic diagram of a second implementation manner of performing three times of sub-interleaving processing on to-be-transmitted data bits in the prior art.

Figure 3:
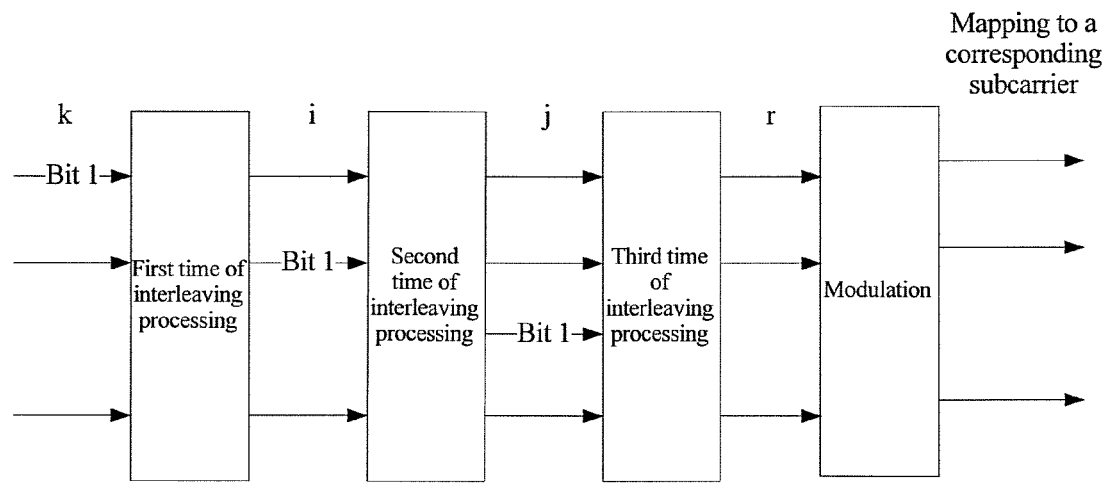
FIG. 3 is a schematic diagram of a second implementation manner of performing three times of sub-interleaving processing on to-be-transmitted data bits in the prior art.

An input location of a transmitted data bit 1, shown in FIG. 3, before the first time of sub-interleaving processing is a first input location of the first time of sub-interleaving processing, and an output location after the first time of sub-interleaving processing may be a second output location of the first time of sub-interleaving processing. In this case, an input location of the transmitted data bit before the second time of sub-interleaving processing is a second input location of the second time of sub-interleaving processing, and an output location after the second time of sub-interleaving processing may be a third output location of the second time of sub-interleaving processing. A relationship between an input location and an output location of the third time of sub-interleaving processing is not described herein, and may be set according to actual needs and a corresponding protocol.

Further, after performing interleaving processing on the to-be-transmitted data bit, a WLAN device modulates the interleaving-processed to-be-transmitted data bit, to obtain a modulated signal, and then maps the modulated signal to a corresponding data subcarrier for sending.

As shown in FIG. 3, each input/output location used for interleaving in an interleaver is corresponding to a corresponding data subcarrier, that is, a to-be-transmitted data bit passing through any input/output location is mapped to a corresponding data subcarrier and sent.

This embodiment does not limit a method for modulating a to-be-transmitted data bit or a correspondence between an input/output location and a data subcarrier, and these are technologies well known to a person skilled in the art, and may be set according to actual needs. Details are not described herein.

For a conventional OFDM system, data of a single user is corresponding to an entire frequency band, a size of an interleaver is corresponding to the bandwidth value (for example, 20 M/40 M/80 M), and parameters ($N_{ROW}$, $N_{COL}$) of the interleaver need to be designed only for three bandwidths. However, for an OFDMA system, a flexible quantity of RUs may be allocated to a single user, and therefore, a quantity of frequency bands corresponding to the user is large. In this case, when the foregoing technology is used, a large quantity of interleavers need to be designed, and a size of each interleaver is $m \cdot n \cdot N_{RU}$. $N_{RU}$ is a quantity of data subcarriers in each RU, m is a modulation order, and n is a quantity of RUs allocated to the user. It may be learned that in the foregoing technology, a group of bit interleavers with different parameters need to be stored, and implementation complexity of the technology is extremely high for a WLAN system.

Still further, after OFDMA is introduced into a next-generation WLAN system, a bit interleaver that is of a fixed length for a single bandwidth and that is defined in the existing WLAN standard cannot be reused, and an interleaver of a more flexible length needs to be designed. For an OFDMA-based WLAN system, when multiple RUs are allocated to a single user, a redesigned interleaving solution needs to have excellent performance, and be easy to implement.

Figure 4:
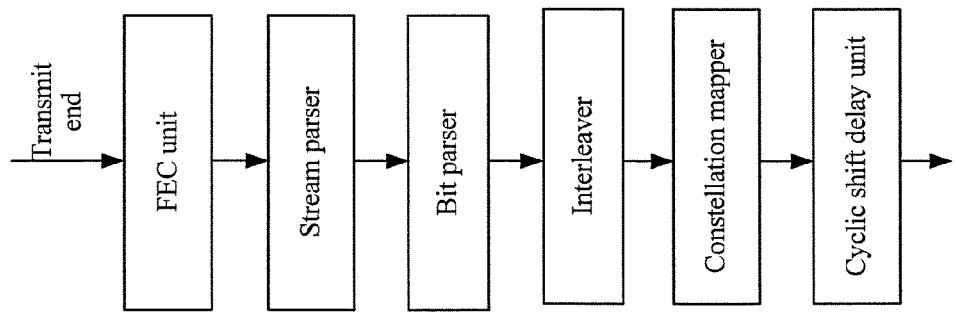
FIG. 4 is a schematic structural diagram of a first implementation manner of a WLAN device according to the present disclosure.

To resolve the foregoing problem, a first embodiment of the present disclosure provides an architectural view of an OFDMA-based WLAN system. When the WLAN system allocates multiple RUs to single user equipment, a serial concatenation apparatus is used. The serial concatenation manner may be a level-3 processor. As shown in FIG. 4, the WLAN device includes an access point (Access Point, AP) and a terminal. For example, a transmit end is the AP, and a receive end is the terminal. As shown in FIG. 4, the transmit end includes an FEC unit, a stream parser, iss bit parsers, an interleaver, a constellation mapper, and a cyclic shift delay unit.

The FEC unit is configured to perform a channel coding operation on data bits to obtain a data bit stream after channel coding.

The stream parser is configured to allocate the single bit stream in the FEC unit to iss spatial data streams. For the spatial data stream, a single data stream needs to be changed into iss data streams in a case of multiple MIMO antennas, so that the multiple antennas can send data simultaneously.

Each of the iss bit parsers is configured to allocate bits in one spatial data stream to n sub resource block interleaving units according to a specific sequence, where n is a positive integer greater than 1, and a value of n is a quantity of resource blocks allocated to the user. The bit parsing unit is configured to sequentially or alternately allocate every s bits in the coded bit stream to the N bit interleaving units, where s is a positive integer greater than 0. If s is 1, a sequence number of a bit allocated to an $i_{RU}{}^{th}$ RU is j, and a correspondence between j and $i_{RU}$ is:

$j=(i_{RU}-1)+n\cdot k$; or if s is greater than 1, a sequence number of a bit allocated to an $i_{RU}{}^{th}$ RU is j, and a correspondence between j and $i_{RU}$ is:

$$j = (i_{RU} - 1) \cdot s + s \cdot n \left\lfloor \frac{k}{s} \right\rfloor + k \bmod s,$$

where k represents a sequence number of a bit in each resource block interleaving unit, k is a non-negative integer, and s represents a quantity of bits consecutively allocated to each resource block interleaving unit.

The interleaver includes the n sub resource block interleaving units. Each sub resource interleaving unit is configured to perform discrete interleaving on input bits. A specific discrete interleaving process includes at least one of the following:

Each of the n sub resource block interleaving units is configured to perform the discrete interleaving on the input bits, and each sub resource block interleaving unit that has performed the discrete interleaving serially outputs the discretely-interleaved input bits to the mapping unit according to a specific sequence;

each sub resource block interleaving unit is configured to input the input bits by row and then output the input bits by column, which is specifically that each sub resource block interleaving unit is configured to alternately map the bits output by column to a least significant bit and a most significant bit in a constellation diagram; and/or each sub resource block interleaving unit is configured to perform cyclic shift on bits in each sub resource block interleaving unit according to a sequence of the sub resource block interleaving units, which is specifically that each sub resource block interleaving unit is configured to perform right or left cyclic shift by s bits on the bits in each sub resource block interleaving unit according to an RU sequence.

Still further, the apparatus further includes a general bit parsing unit, the general bit parsing unit is located between the bit parsing unit and the n sub resource block interleaving units, an output bit stream of the bit parsing unit is sequentially input to the general bit parsing unit in a unit of every m bits, and the general bit parsing unit is configured to interleave the m bits and then allocate the m interleaved bits to the n sub resource block interleaving units according to a specific sequence, where m is a positive integer.

Still further, the apparatus further includes a general resource block interleaving unit, the general resource block interleaving unit is located between the n sub resource block interleaving units and the constellation mapper, each of the n sub resource block interleaving units is configured to perform the discrete interleaving on the input bits and then output the discretely-interleaved input bits to the general resource block interleaving unit in parallel, and the general resource block interleaving unit is configured to perform discrete interleaving on at least two of the n sub resource block interleavers.

The constellation mapper is configured to map an interleaved bit stream to constellation points in the modulation constellation diagram, to obtain a constellation symbol data stream.

The cyclic shift delay unit is configured to perform a cyclic shift delay operation on each spatial data stream.

The receive end includes:

a constellation demapper, configured to demap a received constellation symbol to bit data, to obtain a received bit data stream;

a deinterleaver, configured to perform a deinterleaving operation on the received bit data stream, to obtain each deinterleaved spatial bit data stream;

a bit combiner, configured to combine bits in the n sub resource block interleaving units into a single bit data stream according to a corresponding sequence;

a stream combiner, configured to combine iss spatial data streams into a single bit data stream; and an FEC unit, configured to perform a channel decoding operation on the single bit data stream, to obtain an information data bit sequence.

The receive end performs corresponding processing according to processing at the transmit end. Details are not described herein.

Figure 5:
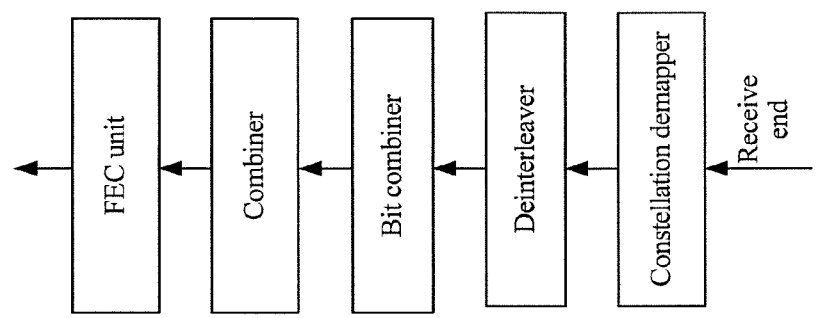
FIG. 5 is a schematic structural diagram of a second implementation manner of a WLAN device according to the present disclosure.
Figure 5:
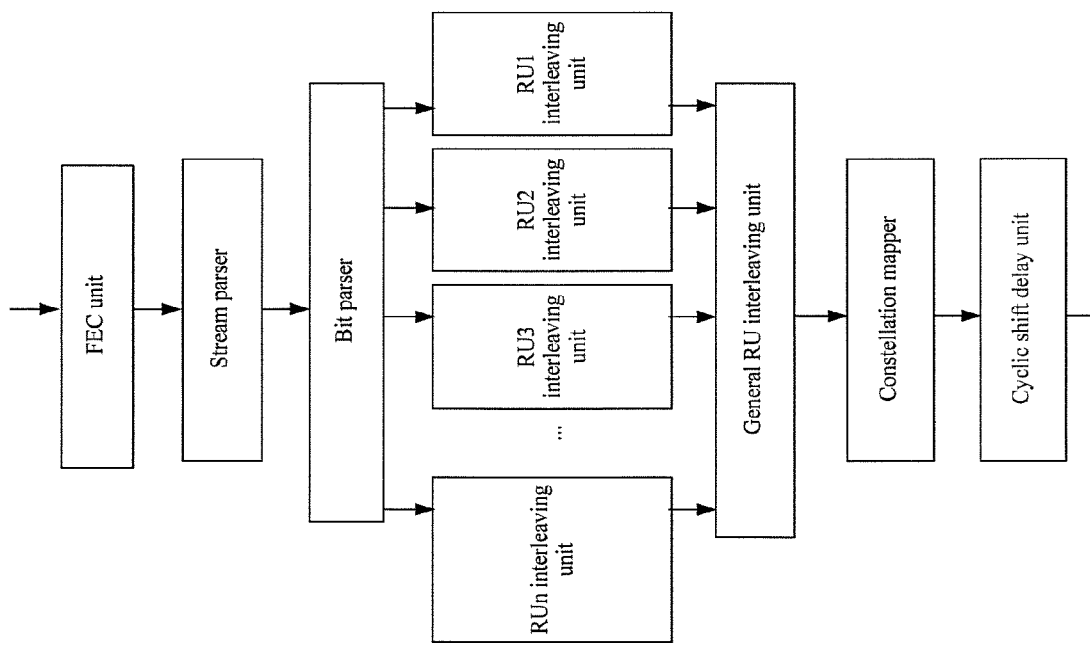

To resolve the foregoing problem, a schematic structural diagram of a second implementation manner of a WLAN device according to this embodiment is shown in FIG. 5. A transmit end of the WLAN device includes the following elements: an FEC encoder, a stream parser, iss bit parsers, n sub resource block interleaving units, a general resource block interleaving unit, a constellation mapper, and a cyclic shift delay unit.

The FEC encoder is configured to perform error control coding (or referred to as channel coding) on a bit data stream to obtain a data bit stream after channel coding.

The stream parser is configured to allocate the single bit stream in the FEC unit to iss spatial data streams. Assuming that there are iss spatial data streams at a data transmit end, the stream parser allocates the single bit stream after the channel coding to the iss spatial data streams.

Each of the iss bit parsers is configured to allocate bits in a coded data stream to n sub resource block interleaving units according to a specific sequence.

Each sub resource interleaving unit in then sub resource block interleaving units is configured to perform discrete interleaving on input bits.

The general resource block interleaving unit is configured to perform discrete interleaving on at least two of the n sub resource block interleavers.

The constellation mapper is configured to map an interleaved bit stream to constellation points in a modulation constellation diagram, to obtain a constellation symbol data stream.

The cyclic shift delay unit is configured to perform a cyclic shift delay operation on each spatial data stream.

For an OFDMA-based system, assuming that n RUs are simultaneously allocated to a same user, a processing procedure of the bit parsing unit using an interleaving solution 1 in the present disclosure is exemplarily described in the following.

The bit parsing unit allocates, in an interleaving manner, all bits in a data stream to multiple RUs corresponding to the user. Assuming that m=$\log_2$ M is a system modulation order, and M is a constellation diagram size, the bit decomposition unit may allocate the bits one by one to an RU1 to an RUn in an interleaving manner. Assuming that s=max{1, m/2}, s represents a quantity of bits consecutively allocated to each resource block interleaving unit, and input of the bit parsing unit is $y_j$, a correspondence between $i_{RU}$ and a sequence number j of a bit allocated to an $i_{RU}$th RU is as follows:

$j=(i_{RU}-1)+n \cdot k$, where $1 \leq i_{RU} \leq n$, k represents a sequence number of a bit in each resource block interleaving unit, k is a non-negative integer, and a value of k is k=0, 1, . . . .

Further, assuming that four RUs are simultaneously allocated to a single user, there are three data subcarriers in each RU, and a system modulation scheme is 64QAM, there are totally 72 bits in one OFDMA symbol bit data stream. According to the foregoing decomposition manner, a sequence of the bit data stream is (0, 1, . . . , 71), and the bit data stream is decomposed bit by bit into four RUs, as shown in the following table:

TABLE 1

| k | First RU | Second RU | Third RU | Fourth RU |
|---|---|---|---|---|
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| 7 | 28 | 29 | 30 | 31 |
| 8 | 32 | 33 | 34 | 35 |
| 9 | 36 | 37 | 38 | 39 |
| 10 | 40 | 41 | 42 | 43 |
| 11 | 44 | 45 | 46 | 47 |
| 12 | 48 | 49 | 50 | 51 |
| 13 | 52 | 53 | 54 | 55 |
| 14 | 56 | 57 | 58 | 59 |
| 15 | 60 | 61 | 62 | 63 |
| 16 | 64 | 65 | 66 | 67 |
| 17 | 68 | 69 | 70 | 71 |

Alternatively, the bit parsing unit may allocate the bits to an RU1 to an RUn in an interleaving manner by using every s bits as a group, and a correspondence between a sequence number j of a bit allocated to an $i_{RU}$th RU and $i_{RU}$ is as follows:

$$j = (i_{RU} - 1) \cdot s + s \cdot n \cdot \left\lfloor \frac{k}{s} \right\rfloor + k \bmod s,$$

where k represents a sequence number of a bit in each resource block interleaving unit, k is a non-negative integer, and s represents a quantity of bits consecutively allocated to each resource block interleaving unit.

According to the foregoing decomposition manner and the foregoing assumption, a sequence of the bit data stream is (0, 1, . . . , 71), and the bit data stream may be decomposed, for example, in a unit of at least two bits, into four RUs, as shown in the following table:

TABLE 2

| k | First RU | Second RU | Third RU | Fourth RU |
|---|---|---|---|---|
| 0 | 0, 1 | 2, 3 | 4, 5 | 6, 7 |
| 1 | 8, 9 | 10, 11 | 12, 13 | 14, 15 |
| 2 | 16, 17 | 18, 19 | 20, 21 | 22, 23 |
| 3 | 24, 25 | 26, 27 | 28, 29 | 30, 31 |
| 4 | 32, 33 | 34, 35 | 36, 37 | 38, 39 |
| 5 | 40, 41 | 42, 43 | 44, 45 | 46, 47 |
| 6 | 48, 49 | 50, 51 | 52, 53 | 54, 55 |
| 7 | 56, 57 | 58, 59 | 60, 61 | 62, 63 |
| 8 | 64, 65 | 66, 67 | 68, 69 | 70, 71 |

In this embodiment of the present disclosure, the bit parsing unit is not limited to sequentially allocating s bits in the data stream to the RU1 to the RUn. For example, alternate allocation may be performed at an interval of q RUs, and in this case, a sequence number of a bit allocated to an $i_{RU}$th RU is j, and a correspondence between j and $i_{RU}$ is:

$$j = n \cdot k + q \cdot ((i_{RU} - 1) \bmod L) + \left\lfloor \frac{i_{RU} - 1}{L} \right\rfloor,$$

where

L=⌈n/q⌉ ensures that the alternate allocation is performed to a beginning of an RU set when having been performed to an end of the RU set, so that the bits are allocated to all RUs, where k represents a sequence number of a bit in each resource block interleaving unit, k is a non-negative integer, and s represents a quantity of bits consecutively allocated to each resource block interleaving unit.

According to the foregoing decomposition manner and the foregoing assumption, a sequence of the bit data stream is (0, 1, . . . , 71), and assuming that q=2, the bit data stream may be decomposed, for example, in a unit of at least two bits, into four RUs, as shown in the following table:

TABLE 3

| k | First RU | Second RU | Third RU | Fourth RU |
|---|---|---|---|---|
| 0 | 0 | 2 | 1 | 3 |
| 1 | 4 | 6 | 5 | 7 |
| 2 | 8 | 10 | 9 | 11 |
| 3 | 12 | 14 | 13 | 15 |
| 4 | 16 | 18 | 17 | 19 |
| 5 | 20 | 22 | 21 | 23 |
| 6 | 24 | 26 | 25 | 27 |

TABLE 3-continued

| k | First RU | Second RU | Third RU | Fourth RU |
|---|----------|-----------|----------|-----------|
| 7 | 28 | 30 | 29 | 31 |
| 8 | 32 | 34 | 33 | 35 |
| 9 | 36 | 38 | 37 | 39 |
| 10 | 40 | 42 | 41 | 43 |
| 11 | 44 | 46 | 45 | 47 |
| 12 | 48 | 50 | 49 | 51 |
| 13 | 52 | 54 | 53 | 55 |
| 14 | 56 | 58 | 57 | 59 |
| 15 | 60 | 62 | 61 | 63 |
| 16 | 64 | 66 | 65 | 67 |
| 17 | 68 | 70 | 69 | 71 |

The n RU interleaving units include an RU1 interleaving unit, an RU2 interleaving unit, an RU3 interleaving unit, . . . , and an RUn interleaving unit. The following implementation manners may be used as an interleaving manner of each RU interleaving unit.

Implementation Manner 1

Each sub resource block interleaving unit is configured to input the input bits by row and then output the input bits by column, and each sub resource block interleaving unit that has performed the discrete interleaving performs serial output according to a specific sequence, or each sub resource block interleaving unit that has performed the discrete interleaving performs parallel output.

Each of the n RU interleaving units uses a row-column interleaver, that is, performs input by row and performs output by column, and parameters of each RU interleaving unit are ($N_{ROW}$,$N_{COL}$). Assuming that bits before and after interleaving are respectively $x_k$ and $w_i$, where k is a bit location sequence number before the interleaving, $x_k$ represents a bit corresponding to a bit location with a sequence number k before the interleaving, i is a bit location sequence number after the interleaving, and $w_i$ represents a bit corresponding to a bit location with a sequence number i after the interleaving, a specific interleaving formula is:

$$i = N_{ROW} \cdot (k \bmod N_{COL}) + \left\lfloor \frac{k}{N_{COL}} \right\rfloor,$$

where $N_{COL}$ and $N_{ROW}$ are known interleaving parameters for processing by a first interleaving processing unit.

The RU1 is used as an example. Assuming that a quantity of data subcarriers in the RU is 12, and a modulation scheme used by a system is 16QAM, and assuming that $N_{COL}$=4, $N_{ROW}$=2×4=8, and a bit sequence in the RU1 before interleaving is (0, 1, . . . , 32), a bit sequence in the first RU after the interleaving is shown in the following table:

TABLE 4

|  | First column | Second column | Third column | Fourth column |
|---|---|---|---|---|
| First row | 0 | 1 | 2 | 3 |
| Second row | 4 | 5 | 6 | 7 |
| Third row | 8 | 9 | 10 | 11 |
| Fourth row | 12 | 13 | 14 | 15 |
| Fifth row | 16 | 17 | 18 | 19 |
| Sixth row | 20 | 21 | 22 | 23 |
| Seventh row | 24 | 25 | 26 | 27 |
| Eighth row | 28 | 29 | 30 | 31 |

After bits are read by column, a bit sequence in the RU1 is: (0, 4, 8, 12, 16, 20, 24, 28, 1, 5, 9, 13, 17, 21, 25, 29, 2, 6, . . . , 27, 31).

Implementation Manner 2

Figure 6:
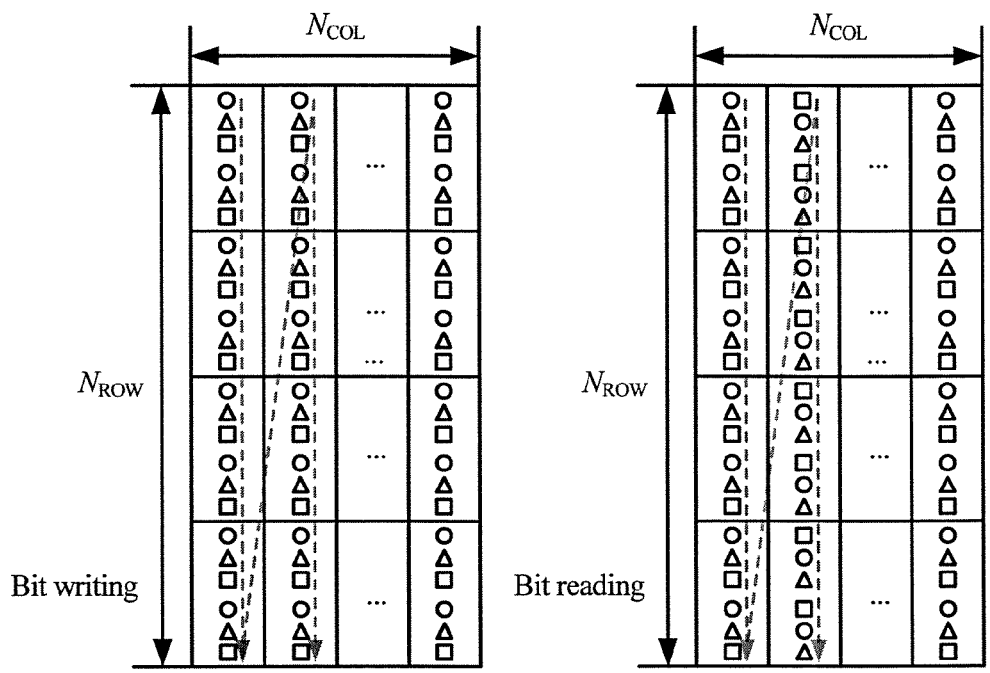
FIG. 6 is a schematic diagram of an interleaving manner of a sub resource block interleaving unit according to an embodiment of the present disclosure.

Each sub resource block interleaving unit is configured to perform cyclic shift on bits in each sub resource block interleaving unit according to a sequence of the sub resource block interleaving units, and the cyclic-shifted bits are serially output from each sub resource block interleaving unit according to a specific sequence, or output in parallel from each sub resource block interleaving unit that has performed the discrete interleaving. A specific implementation manner is shown in FIG. 6. FIG. 6 is a schematic diagram of a specific interleaving manner of the sub resource block interleaving unit according to this embodiment of the present disclosure.

Each bit interleaving unit maps adjacent coded bits to a least significant bit and a most significant bit in a constellation diagram in an interleaving manner. It is assumed that $m=\log_2 M$ is a constellation point modulation order (m=4 in a case of 16QAM), and s=max{1, m/2}, and it is assumed that bits before and after interleaving are respectively $y_j$ and $w_k$, where i is a bit location sequence number before the interleaving, $y_j$ represents a bit corresponding to a bit location with a sequence number i before the interleaving, k is a bit location sequence number after the interleaving, $w_k$ represents a bit corresponding to a bit location with a sequence number k after the interleaving, and $N_{CBPSS}$ is a quantity of bits after the data stream is coded. A specific interleaving formula is:

$$j = s \cdot \left\lfloor \frac{k}{s} \right\rfloor + \left( k + N_{CBPSS} - \left\lfloor \frac{N_{COL} \cdot k}{N_{CBPSS}} \right\rfloor \right) \bmod s,$$

where $N_{CBPSS}$ is a quantity of coded bits in each spatial data stream.

The RU1 is used as an example. Assuming that a quantity of data subcarriers in the RU is 12, and a modulation scheme used by a system is BPSK, and assuming that $N_{COL}$=4, $N_{ROW}$=3, in view of the foregoing table, a bit sequence in the RU1 after interleaving is shown in the following table:

TABLE 5

|  | First column | Second column | Third column | Fourth column |
|---|---|---|---|---|
| First row | 0 | 5 | 2 | 7 |
| Second row | 4 | 1 | 6 | 3 |
| Third row | 8 | 13 | 10 | 15 |
| Fourth row | 12 | 9 | 14 | 11 |
| Fifth row | 16 | 21 | 18 | 23 |
| Sixth row | 20 | 17 | 22 | 19 |
| Seventh row | 24 | 29 | 26 | 31 |
| Eighth row | 28 | 25 | 30 | 27 |

Independent interleaving may be performed in the foregoing implementation manner 1 and implementation manner 2, that is, interleaving is performed only once. Alternatively, interleaving may be performed in both the implementation manner 1 and the implementation manner 2, that is, interleaving is performed according to the implementation manner 1, and then interleaving is performed according to the implementation manner 2, that is, interleaving is performed twice.

Implementation Manner 3

Each sub resource block interleaving unit is configured to alternately map the bits output by column to a least significant bit and a most significant bit in a constellation diagram. The cyclic-shifted bits are serially output from each sub resource block interleaving unit according to a specific sequence, or output in parallel from each sub resource block interleaving unit that has performed the discrete interleaving.

In the implementation manner 3 of the present disclosure, alternatively, each sub resource block interleaving unit may use an RU I/Q interleaving manner. Specifically, each RU performs a rotation operation on bits on an I/Q channel that are corresponding to constellation points, to prevent coded bits from being continuously mapped to least significant bits in the constellation diagram. A specific interleaving manner is shown in FIG. 7.

Figure 7:
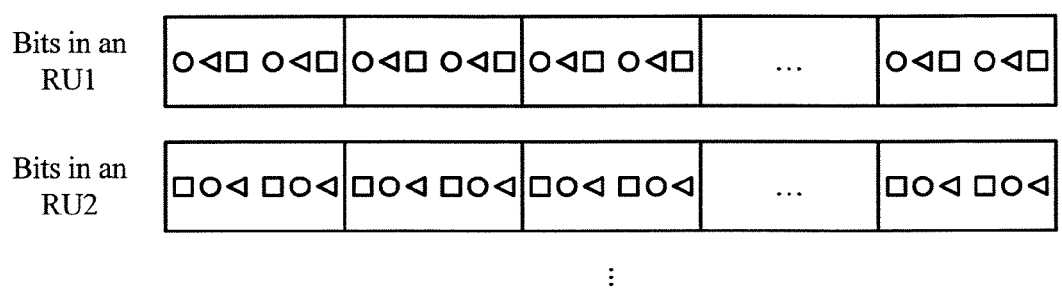
FIG. 7 is a schematic diagram of another interleaving manner of a sub resource block interleaving unit according to an embodiment of the present disclosure.

FIG. 7 shows an example of an RU I/Q interleaving unit. If a modulation scheme is 64QAM, it may be learned that there is no change to locations of bits in the RU1, but RU2 data undergoes right cyclic shift by 1 bit by using every s=m/2=3 bits as a group, RU3 data undergoes right cyclic shift by 2 bits by using every 3 bits as a group, and so on.

Assuming that s=max{1, m/2}, an input bit of an $i_{RU}{}^{th}$ RU is $w_k^{iRU}$, and output of the RU I/Q interleaving unit is a correspondence between j and $i_{RU}$ is:

$$j = s \cdot \left\lfloor \frac{k}{s} \right\rfloor + (k - (i_{RU} - 1) + n \cdot m) \bmod s,$$

where $1 \leq i_{RU} \leq n$, k=0, 1, . . . , n is a quantity of RUs allocated to the user, m is a modulation order, k is a bit location sequence number in the $i_{RU}{}^{th}$ before I/Q interleaving, and j is a bit location sequence number in the $i_{RU}{}^{th}$ RU after the I/Q interleaving.

Assuming that four RUs are simultaneously allocated to a single user, there are three data subcarriers in each RU, and a system modulation scheme is 64QAM, there are totally 72 bits in one OFDMA symbol bit data stream. According to the foregoing decomposition manner, in view of Table 1, bit sequences in the four RUs are shown in Table 6:

TABLE 6

| k | First RU | Second RU | Third RU | Fourth RU |
|---|----------|-----------|----------|-----------|
| 0 | 0 | 9 | 6 | 3 |
| 1 | 4 | 1 | 10 | 7 |
| 2 | 8 | 5 | 2 | 11 |
| 3 | 12 | 21 | 18 | 15 |
| 4 | 16 | 13 | 22 | 19 |
| 5 | 20 | 17 | 14 | 23 |
| 6 | 24 | 33 | 30 | 27 |
| 7 | 28 | 25 | 34 | 31 |
| 8 | 32 | 29 | 26 | 35 |
| 9 | 36 | 45 | 42 | 39 |
| 10 | 40 | 37 | 46 | 43 |
| 11 | 44 | 41 | 38 | 47 |
| 12 | 48 | 57 | 54 | 51 |
| 13 | 52 | 49 | 58 | 55 |
| 14 | 56 | 53 | 50 | 59 |
| 15 | 60 | 69 | 66 | 63 |
| 16 | 64 | 61 | 70 | 67 |
| 17 | 68 | 65 | 62 | 71 |

In addition, alternatively, left cyclic shift may be performed in the RU I/Q interleaving unit, and in this case, $$j = s \cdot \left\lfloor \frac{k}{s} \right\rfloor + (k + (i_{RU} - 1)) \bmod s,$$

where $1 \leq i_{RU} \leq n$, and k=0,1, . . . .

Independent interleaving may be performed in the implementation manner 3 of the present disclosure, that is, interleaving is performed only once. Alternatively, interleaving may be performed in both the implementation manner 3 and the implementation manner 1, that is, interleaving is performed according to the implementation manner 1, and then interleaving is performed according to the implementation manner 3, that is, interleaving is performed twice.

A quantity of sub resource block interleaving units in this embodiment of the present disclosure is n, that is, the quantity of RUs allocated to the user. The general RU interleaving unit is located between the n sub resource block interleaving units and the constellation mapper, each of the n sub resource block interleaving units is configured to perform the discrete interleaving on the input bits and then output in parallel the discretely-interleaved input bits to the general resource block interleaving unit, and the general RU interleaving unit is configured to perform the discrete interleaving on the at least two of the n sub resource block interleavers.

The general RU interleaving unit does not interleave bits in each sub RU interleaving unit, but performs only an overall permutation operation on RUs, thereby improving a frequency diversity coding gain of the system while implementing low complexity. A size of the general RU interleaving unit is far less than that of a conventional bit interleaver. Therefore, an interleaving rule of the general RU interleaving unit may be prestored as a list. A correspondence between RU location sequence numbers before interleaving and RU location sequence numbers after the interleaving is stored in the list. The list is searched when a specific interleaving operation is being performed. In addition, alternatively, the RU interleaver may use a simple interleaving rule for interleaving, for example, a row-column interleaver. When the row-column interleaver is used, a quantity of columns of the row-column interleaver may be first fixed, and a quantity of rows may increase gradually as interleaved elements increase. In addition, alternatively, a quantity of rows of the row-column interleaver may be first fixed, and a quantity of columns may increase gradually as interleaved elements increase.

When the quantity of columns of the row-column interleaver is fixed at 2, an interleaving rule for even and odd quantities of to-be-interleaved elements is shown in Table 7. Herein, n is an even number, P is an even number, the left table indicates that each row and each column of the row-column interleaver can be filled when there are n to-be-interleaved elements, the last element in the last row of the row-column interleaver is empty when there are P to-be-interleaved elements, and in this case, the element is ignored when write and read operations are being performed.

TABLE 7

| 1 | 2 | 1 | 2 |
|---|---|---|---|
| 3 | 4 | 3 | 4 |
| ... | ... | ... | ... |
| n − 1 | n | p | x |

Assuming that four RUs are simultaneously allocated to a single user, there are three data subcarriers in each RU, and a system modulation scheme is 64QAM, there are totally 72 bits in one OFDMA symbol bit data stream. According to the foregoing decomposition manner, in view of Table 6, bit sequences in the four RUs are shown in Table 8:

TABLE 8

| k | First RU | Second RU | Third RU | Fourth RU |
|---|---|---|---|---|
| 0 | 0 | 6 | 9 | 3 |
| 1 | 4 | 10 | 1 | 7 |
| 2 | 8 | 2 | 5 | 11 |
| 3 | 12 | 18 | 21 | 15 |
| 4 | 16 | 22 | 13 | 19 |
| 5 | 20 | 14 | 17 | 23 |
| 6 | 24 | 30 | 33 | 27 |
| 7 | 28 | 34 | 25 | 31 |
| 8 | 32 | 26 | 29 | 35 |
| 9 | 36 | 42 | 45 | 39 |
| 10 | 40 | 46 | 37 | 43 |
| 11 | 44 | 38 | 41 | 47 |
| 12 | 48 | 54 | 57 | 51 |
| 13 | 52 | 58 | 49 | 55 |
| 14 | 56 | 50 | 53 | 59 |
| 15 | 60 | 66 | 69 | 63 |
| 16 | 64 | 70 | 61 | 67 |
| 17 | 68 | 62 | 65 | 71 |

In addition, alternatively, the general RU interleaving unit may be integrated into the bit decomposition unit. The bit decomposition unit changes a bit allocation rule, to achieve a same function as the RU interleaver.

In addition, in the foregoing embodiment, each sub resource block interleaving unit that has performed the discrete interleaving performs parallel output to the general RU interleaving unit for interleaving between RUs. Alternatively, in this embodiment of the present disclosure, the general RU interleaving unit may not be used, and each sub resource block interleaving unit performs serial output to the constellation mapping unit according to a specific sequence. Specific serial output may be performed in an alternate manner or another discrete manner. This is not described in detail in the present disclosure.

In this embodiment of the present disclosure, in an OFMDA-based WLAN system, the foregoing system architecture is used, so that a problem that a bit interleaver cannot be reused is resolved, and in addition, an interleaver based on this design has a more flexible length. When multiple RUs are allocated to a single user, the foregoing designed interleaving solution needs to have excellent performance, and be easy to implement.

Figure 8:
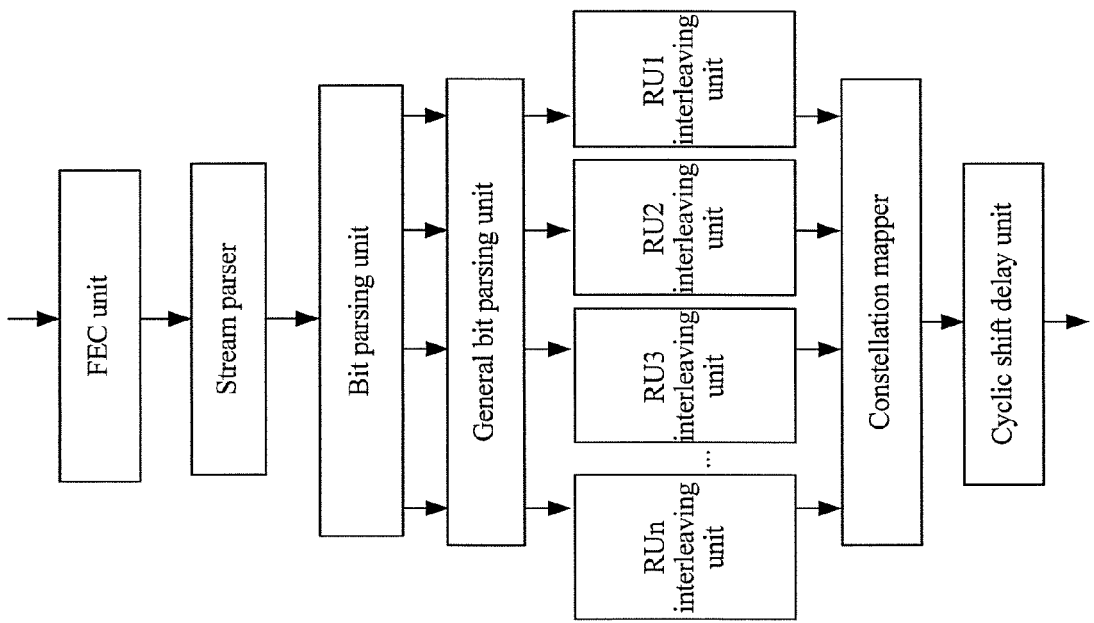
FIG. 8 is a schematic structural diagram of a third implementation manner of a WLAN device according to the present disclosure.

FIG. 8 is a schematic structural diagram of a third implementation manner of a WLAN device according to an embodiment of the present disclosure. As shown in FIG. 8, a difference from the second implementation manner of the WLAN device in the embodiment of the present disclosure lies in that a general bit parsing unit is added between a bit parser and n RU interleaving units, and the n RU interleaving units are directly connected to a constellation device. The general bit parsing unit is added after the bit parsing unit. For an OFDMA-based system, assuming that n RUs are simultaneously allocated to a same user, a bit processing procedure is exemplarily described in the following.

The bit parsing unit sequentially inputs an output bit stream of a stream parser to the general bit parsing unit in a unit of every n bits, and the general bit parsing unit interleaves the n bits, and then sends the n interleaved bits to the n resource block interleaving units. A processing procedure of the n resource block interleaving units is the same as that described in the foregoing solution 1.

Assuming that four RUs are simultaneously allocated to a single user, the bit parsing unit sequentially inputs the output bit stream of the stream parser to the general bit parsing unit in a unit of every 8 bits. For example, output bits of the bit parsing unit are (0, 1, 2, 3, 4, 5, 6, 7) from top to bottom according to FIG. 9, and a sequence of output bits after the general bit parsing unit performs interleaving according to a row-column interleaver shown in the following Table 9 is (0, 2, 4, 6, 1, 3, 5, 7) from top to bottom. The 8 bits are written into each resource block, and then the 8 bits are read. The foregoing process is repeated until each resource block is filled.

TABLE 9

| 0 | 1 |
|---|---|
| 2 | 3 |
| 4 | 5 |
| 6 | 7 |

In the foregoing embodiment, in an OFMDA-based WLAN system, the foregoing system architecture is used, so that a problem that a bit interleaver cannot be reused is resolved, and in addition, an interleaver based on this design has a more flexible length. When multiple RUs are allocated to a single user, the foregoing designed interleaving solution needs to have excellent performance, and be easy to implement.

Figure 9:
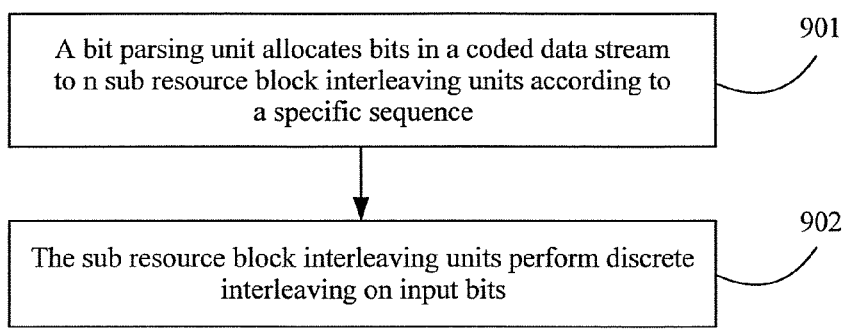
FIG. 9 is a flowchart of a first implementation manner of an interleaving processing method in a WLAN system according to the present disclosure.

To resolve the foregoing problem, this embodiment provides an interleaving processing method in an OFDMA-based WLAN system. The method may be executed by a WLAN device including an interleaver. As shown in FIG. 9, FIG. 9 is a flowchart of a first implementation manner of an interleaving processing method for a transmit end in a WLAN system according to the present disclosure, and the following steps are specifically included.

Step 901: A bit parsing unit allocates bits in a coded data stream to n sub resource block interleaving units according to a specific sequence, where n is a positive integer greater than 1, and a value of n is a quantity of resource blocks allocated to the user.

The bit parsing unit sequentially or alternately allocates every s bits in the coded bit stream to the n bit interleaving units, where s is a positive integer greater than 0. If s is 1, a sequence number of a bit allocated to an $i_{RU}{}^{th}$ RU is j, and a correspondence between j and $i_{RU}$ is:

$j=(i_{RU}-1)+n \cdot k$; or if s is greater than 1, a sequence number of a bit allocated to an $i_{RU}{}^{th}$ RU is j, and a correspondence between j and $i_{RU}$ is $$j = (i_{RU} - 1) \cdot s + s \cdot n \cdot \left\lfloor \frac{k}{s} \right\rfloor + k \bmod s,$$

where k represents a sequence number of a bit in each resource block interleaving unit, k is a non-negative integer, and s represents a quantity of bits consecutively allocated to each resource block interleaving unit.

Step 902: The sub resource block interleaving units perform discrete interleaving on input bits.

That the n resource block interleaving units perform discrete interleaving on input bits is specifically: each of then sub resource block interleaving units performs discrete interleaving on input bits, and each sub resource block interleaving unit that has performed the discrete interleaving performs serial output according to a specific sequence, or each sub resource block interleaving unit that has performed the discrete interleaving performs parallel output.

That each sub resource block interleaving unit performs discrete interleaving on input bits is specifically: each sub resource block interleaving unit inputs the input bits by row and then outputs the input bits by column; and/or each sub resource block interleaving unit performs cyclic shift on bits in each sub resource block interleaving unit according to a sequence of the sub resource block interleaving units.

That each sub resource block interleaving unit inputs the input bits by row and then outputs the input bits by column further includes: alternately mapping, by each sub resource block interleaving unit, the bits output by column to a least significant bit and a most significant bit in a constellation diagram.

That each sub resource block interleaving unit performs cyclic shift on bits in each sub resource block interleaving unit according to a sequence of the sub resource block interleaving units is specifically: each sub resource block interleaving unit performs right or left cyclic shift by s bits on the bits in each sub resource block interleaving unit according to an RU sequence.

If each sub resource block interleaving unit is configured to perform the right cyclic shift by s bits on the bits in each sub resource block interleaving unit according to the RU sequence, a correspondence between an input bit and an output bit j of the $i_{RU}{}^{th}$ RU is:

$$j = s \cdot \left\lfloor \frac{k}{s} \right\rfloor + (k - (i_{RU} - 1) + n \cdot m) \bmod s;$$

or if each sub resource block interleaving unit is configured to perform the left cyclic shift by s bits on the bits in each sub resource block interleaving unit according to the RU sequence, a correspondence between an input bit and an output bit j of the $i_{RU}{}^{th}$ RU is:

$$j = s \cdot \left\lfloor \frac{k}{s} \right\rfloor + (k - (i_{RU} - 1)) \bmod s,$$

where $1 \le i_{RU} \le n$, k=0, 1, . . . n is a quantity of RUs allocated to the user, m is a modulation order, k is a bit location sequence number in the $i_{RU}{}^{th}$ RU before I/Q interleaving, and j is a bit location sequence number in the $i_{RU}{}^{th}$ RU after the I/Q interleaving.

After step 901, the method further includes: sequentially inputting an output bit stream of the bit parsing unit to a general bit parsing unit in a unit of every r bits; and interleaving, by the general bit parsing unit, the r bits, and then allocating the r interleaved bits to the n sub resource block interleaving units according to a specific sequence, where r is a positive integer.

After step 902, the method further includes: performing, by each of the n sub resource block interleaving units, the discrete interleaving on the input bits, and then outputting the discretely-interleaved input bits to a general resource block interleaving unit in parallel; and performing, by the general resource block interleaving unit, discrete interleaving on at least two of the n sub resource block interleaving units.

The performing, by the general resource block interleaving unit, discrete interleaving on at least two bit interleavers in the n sub resource block interleavers is specifically: interleaving, by the general resource block interleaving unit, each of the n bit interleavers according to a preset list; or interleaving, by the general resource block interleaving unit, each of the n bit interleavers in a row-column manner.

Figure 10:
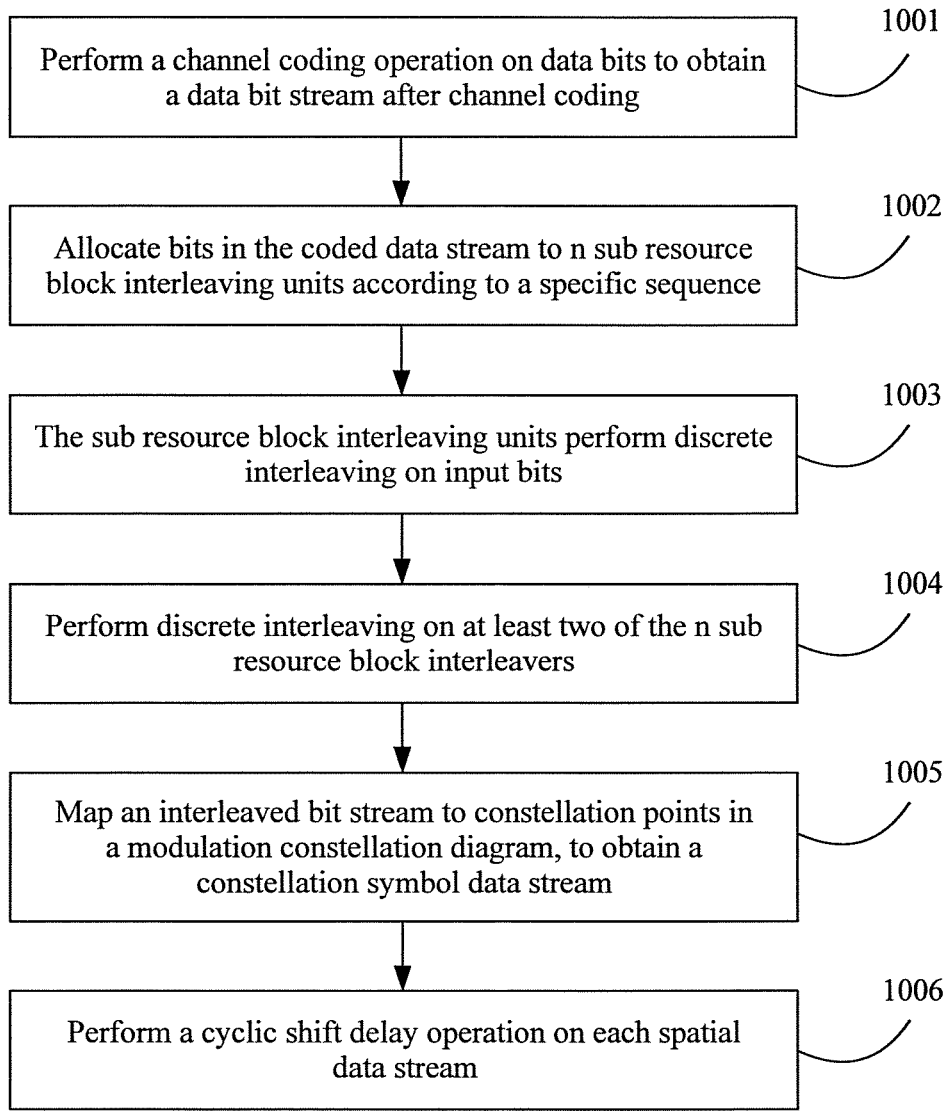
FIG. 10 is a flowchart of a second implementation manner of an interleaving processing method in a WLAN system according to the present disclosure.

To resolve the foregoing problem, a flowchart of a second implementation manner of an interleaving processing method in a WLAN system according to the present disclosure is shown in FIG. 10, and the method includes the following steps.

Step 1001: Perform error control coding (or referred to as channel coding) on a bit data stream to obtain a data bit stream after channel coding, where this step may be performed by an FEC encoder.

Step 1002: Allocate bits in one spatial data stream to n sub resource block interleaving units according to a specific sequence, where this step may be performed by a bit parser, and a stream parser or a processor may be further included to allocate the single bit stream obtained after processing in step 1001 to iss spatial data streams, and then allocate the iss spatial data streams to the n sub resource block interleaving units according to a specific sequence. Assuming that there are iss spatial data streams at a data transmit end, the stream parser or the processor allocates the single bit stream after the channel coding to the iss spatial data streams.

Step 1003: Each sub resource interleaving unit in the n sub resource block interleaving units performs discrete interleaving on input bits.

Step 1004: Perform discrete interleaving on at least two of the n sub resource block interleavers.

Step 1005: Map an interleaved bit stream to constellation points in a modulation constellation diagram, to obtain a constellation symbol data stream.

Step 1006: Acyclic shift delay unit is configured to perform a cyclic shift delay operation on each spatial data stream.

Step 1003 and step 1004 may be performed in an interleaver. The interleaver includes the n sub resource block interleaving units and a general resource block interleaving unit. Step 1005 may be performed in a constellation mapper, and step 1006 may be performed in the cyclic shift delayer. Still further, in this embodiment of the present disclosure, the foregoing steps are not limited to being performed by the foregoing independent elements, and step 1001 to step 1006 may be performed by a processor.

For an OFDMA-based system, assuming that n RUs are simultaneously allocated to a same user, interleaving may be performed in step 1002 in the following manner.

All bits in a data stream are allocated, in an interleaving manner, to multiple RUs corresponding to the user. Assuming that $m=\log_2 M$ is a system modulation order, and M is a constellation diagram size, the bit decomposition unit may allocate the bits one by one to an RU1 to an RUn in an interleaving manner. Assuming that $s=\max\{1, m/2\}$, s represents a quantity of bits consecutively allocated to each resource block interleaving unit, and input of the bit parsing unit is $y_j$, a correspondence between $i_{RU}$ and a sequence number j of a bit allocated to an $i_{RU}{}^{th}$ RU is as follows:

$$j = (i_{RU} - 1) + n \cdot k, \text{ where}$$

1≤$i_{RU}$≤n, k represents a sequence number of a bit in each resource block interleaving unit, k is a non-negative integer, and a value of k is k=0, 1, . . . .

Further, assuming that four RUs are simultaneously allocated to a single user, there are three data subcarriers in each RU, and a system modulation scheme is 64QAM, there are totally 72 bits in one OFDMA symbol bit data stream. According to the foregoing decomposition manner, a sequence of the bit data stream is (0, 1, . . . , 71), and the bit data stream is decomposed bit by bit into four RUs, as shown in the foregoing Table 1. Details are not described herein again.

In step 1002, the bits may be allocated to an RU1 to an RUn in an interleaving manner by using every s bits as a group, and a correspondence between a sequence number j of a bit allocated to the $i_{RU}{}^{th}$ RU and $i_{RU}$ is as follows:

$$j = (i_{RU} - 1) \cdot s + s \cdot n \cdot \left\lfloor \frac{k}{s} \right\rfloor + k \bmod s,$$

where k represents a sequence number of a bit in each resource block interleaving unit, k is a non-negative integer, and s represents a quantity of bits consecutively allocated to each resource block interleaving unit.

According to the foregoing decomposition manner and the foregoing assumption, a sequence of the bit data stream is (0, 1, . . . , 71), and the bit data stream may be decomposed, for example, in a unit of at least two bits, into four RUs, as shown in the foregoing Table 2. Details are not described herein again.

Step 1002 is not limited to sequentially allocating s bits in the data stream to the RU1 to the RUn. For example, alternate allocation may be performed at an interval of q RUs, and in this case, a sequence number of a bit allocated to an $i_{RU}{}^{th}$ RU is j, and a correspondence between j and $i_{RU}$ is:

$$j = n \cdot k + q \cdot ((i_{RU} - 1) \bmod L) + \left\lfloor \frac{i_{RU} - 1}{L} \right\rfloor,$$

where

L=⌈n/q⌉ ensures that the alternate allocation is performed to a beginning of an RU set when having been performed to an end of the RU set, so that the bits are allocated to all RUs, where k represents a sequence number of a bit in each resource block interleaving unit, k is a non-negative integer, and s represents a quantity of bits consecutively allocated to each resource block interleaving unit.

According to the foregoing decomposition manner and the foregoing assumption, a sequence of the bit data stream is (0, 1, . . . , 71), and assuming that q=2, the bit data stream may be decomposed, for example, in a unit of at least two bits, into four RUs, as shown in the foregoing Table 3. Details are not described herein again.

The n RU interleaving units include an RU1 interleaving unit, an RU2 interleaving unit, an RU3 interleaving unit, . . . , and an RUn interleaving unit. The following implementation manners may be used as an interleaving manner of each RU interleaving unit.

Implementation Manner 1

In step 1003, each sub resource block interleaving unit inputs the input bits by row and then outputs the input bits by column, and each sub resource block interleaving unit that has performed the discrete interleaving performs serial output according to a specific sequence, or each sub resource block interleaving unit that has performed the discrete interleaving performs parallel output.

Each of the n RU interleaving units uses a row-column interleaver, that is, performs input by row and performs output by column, and parameters of each RU interleaving unit are ($N_{ROW}$, $N_{COL}$). Assuming that bits before and after interleaving are respectively $x_k$ and $w_i$, where k is a bit location sequence number before the interleaving, $x_k$ represents a bit corresponding to a bit location with a sequence number k before the interleaving, i is a bit location sequence number after the interleaving, and $w_i$ represents a bit corresponding to a bit location with a sequence number i after the interleaving, a specific interleaving formula is:

$$i = N_{ROW} \cdot (k \bmod N_{COL}) + \left\lfloor \frac{k}{N_{COL}} \right\rfloor,$$

where $N_{COL}$ and $N_{ROW}$ are known interleaving parameters for processing by a first interleaving processing unit.

The RU1 is used as an example. Assuming that a quantity of data subcarriers in the RU is 12, and a modulation scheme used by a system is 16QAM, and assuming that $N_{COL}$=4, $N_{ROW}$=2×4=8, and a bit sequence in the RU1 before interleaving is (0, 1, . . . , 32), a bit sequence in the first RU after the interleaving is shown in the foregoing Table 4. Details are not described herein again.

After bits are read by column, a bit sequence in the RU1 is: (0, 4, 8, 12, 16, 20, 24, 28, 1, 5, 9, 13, 17, 21, 25, 29, 2, 6, . . . , 27, 31).

Implementation Manner 2

In step 1003, each sub resource block interleaving unit performs cyclic shift on bits in each sub resource block interleaving unit according to a sequence of the sub resource block interleaving units, and the cyclic-shifted bits are serially output from each sub resource block interleaving unit according to a specific sequence, or output in parallel from each sub resource block interleaving unit that has performed the discrete interleaving. For a specific implementation manner, reference may be made to FIG. 6.

Each bit interleaving unit maps adjacent coded bits to a least significant bit and a most significant bit in a constellation diagram in an interleaving manner. It is assumed that m=$\log_2$ M is a constellation point modulation order (m=4 in a case of 16QAM), and s=max{1, m/2}, and it is assumed that bits before and after interleaving are respectively $y_j$ and $w_k$, where i is a bit location sequence number before the interleaving, $y_j$ represents a bit corresponding to a bit location with a sequence number i before the interleaving, k is a bit location sequence number after the interleaving, $w_k$ represents a bit corresponding to a bit location with a sequence number k after the interleaving, and $N_{CBPSS}$ is a quantity of bits after the data stream is coded. A specific interleaving formula is:

$$j = s \cdot \left\lfloor \frac{k}{s} \right\rfloor + \left(k + N_{CBPSS} - \left\lfloor \frac{N_{COL} \cdot k}{N_{CBPSS}} \right\rfloor \right) \bmod s,$$

where $N_{CBPSS}$ is a quantity of coded bits in each spatial data stream.

The RU1 is used as an example. Assuming that a quantity of data subcarriers in the RU is 12, and a modulation scheme used by a system is BPSK, and assuming that $N_{COL}=4$, $N_{ROW}=3$, in view of the foregoing table, a bit sequence in the RU1 after interleaving is shown in the foregoing Table 5. Details are not described herein again.

Independent interleaving may be performed in the foregoing implementation manner 1 and implementation manner 2, that is, interleaving is performed only once. Alternatively, interleaving may be performed in both the implementation manner 1 and the implementation manner 2, that is, interleaving is performed according to the implementation manner 1, and then interleaving is performed according to the implementation manner 2, that is, interleaving is performed twice.

Implementation Manner 3

In step 1003, each sub resource block interleaving unit alternately maps the bits output by column to a least significant bit and a most significant bit in a constellation diagram. The cyclic-shifted bits are serially output from each sub resource block interleaving unit according to a specific sequence, or output in parallel from each sub resource block interleaving unit that has performed the discrete interleaving.

In the implementation manner 3 of the present disclosure, alternatively, each sub resource block interleaving unit may use an RU I/Q interleaving manner. Specifically, each RU performs a rotation operation on bits on an I/Q channel that are corresponding to constellation points, to prevent coded bits from being continuously mapped to least significant bits in the constellation diagram. For a specific interleaving manner, reference may be made to FIG. 7.

FIG. 7 shows an example of an RU I/Q interleaving unit. If a modulation scheme is 64QAM, it may be learned that there is no change to locations of bits in the RU1, but RU2 data undergoes right cyclic shift by 1 bit by using every $s=m/2=3$ bits as a group, RU3 data undergoes right cyclic shift by 2 bits by using every 3 bits as a group, and so on.

Assuming that $s=\max\{1, m/2\}$, an input bit of an $i_{RU}^{th}$ RU is $w_k^{i_{RU}}$, k and output of the RU I/Q interleaving unit is $y_j^{i_{RU}}$, a correspondence between j and $i_{RU}$ is:

$$j = s \cdot \left\lfloor \frac{k}{s} \right\rfloor + (k - (i_{RU} - 1) + n \cdot m) \bmod s,$$

where $1 \leq i_{RU} \leq n$, $k=0, 1, \ldots$, n is a quantity of RUs allocated to the user, m is a modulation order, k is a bit location sequence number in the $i_{RU}^{th}$ RU before I/Q interleaving, and j is a bit location sequence number in the $i_{RU}^{th}$ RU after the I/Q interleaving.

Assuming that four RUs are simultaneously allocated to a single user, there are three data subcarriers in each RU, and a system modulation scheme is 64QAM, there are totally 72 bits in one OFDMA symbol bit data stream. According to the foregoing decomposition manner, in view of Table 1, bit sequences in the four RUs are shown in the foregoing Table 6. Details are not described herein again.

In addition, alternatively, left cyclic shift may be performed in the RU I/Q interleaving unit, and in this case, $$j = s \cdot \left\lfloor \frac{k}{s} \right\rfloor + (k + (i_{RU} - 1)) \bmod s,$$

where $1 \leq i_{RU} \leq n$, and $k=0,1,\ldots$.

Independent interleaving may be performed in the implementation manner 3 of the present disclosure, that is, interleaving is performed only once. Alternatively, interleaving may be performed in both the implementation manner 3 and the implementation manner 1, that is, interleaving is performed according to the implementation manner 1, and then interleaving is performed according to the implementation manner 3, that is, interleaving is performed twice.

A quantity of sub resource block interleaving units in this embodiment of the present disclosure is n, that is, the quantity of RUs allocated to the user. Each of the n sub resource block interleaving units is configured to perform the discrete interleaving on the input bits and then output in parallel the discretely-interleaved input bits to the general resource block interleaving unit. In step 1004, the discrete interleaving is performed on the at least two of the n sub resource block interleavers.

In step 1004, interleaving is not performed on bits in each sub RU interleaving unit, and only an overall permutation operation is performed on RUs, thereby improving a frequency diversity coding gain of the system while implementing low complexity. A size of the general RU interleaving unit is far less than that of a conventional bit interleaver. Therefore, an interleaving rule of the general RU interleaving unit may be prestored as a list. The list is searched when a specific interleaving operation is being performed. In addition, alternatively, the RU interleaver may use a simple interleaving rule for interleaving, for example, a row-column interleaver. When the row-column interleaver is used, a quantity of columns of the row-column interleaver may be first fixed, and a quantity of rows may increase gradually as interleaved elements increase. In addition, alternatively, a quantity of rows of the row-column interleaver may be first fixed, and a quantity of columns may increase gradually as interleaved elements increase.

When the quantity of columns of the row-column interleaver is fixed at 2, an interleaving rule for even and odd quantities of to-be-interleaved elements is shown in the foregoing Table 7. Details are not described herein again. Herein, n is an even number, P is an even number, the left table indicates that each row and each column of the row-column interleaver can be filled when there are n to-be-interleaved elements, the last element in the last row of the row-column interleaver is empty when there are P to-be-interleaved elements, and in this case, the element is ignored when write and read operations are being performed.

Assuming that four RUs are simultaneously allocated to a single user, there are three data subcarriers in each RU, and a system modulation scheme is 64QAM, there are totally 72 bits in one OFDMA symbol bit data stream. According to the foregoing decomposition manner, in view of Table 6, bit sequences in the four RUs are shown in the foregoing Table 8. Details are not described herein again.

In addition, as described above, in step 1003 and step 1004, independent interleavers may be used, or one interleaver may be used for processing.

In addition, in step 1004 in the foregoing embodiment, each sub resource block interleaving unit that has performed the discrete interleaving outputs in parallel the bits to the general RU interleaving unit for interleaving between RUs. Alternatively, in this embodiment of the present disclosure, the general RU interleaving unit may not be used, and each sub resource block interleaving unit performs serial output to the constellation mapping unit according to a specific sequence. Specific serial output may be performed in an alternate manner or another discrete manner. This is not described in detail in the present disclosure.

In this embodiment of the present disclosure, in an OFMDA-based WLAN system, the foregoing system architecture is used, so that a problem that a bit interleaver cannot be reused is resolved, and in addition, an interleaver based on this design has a more flexible length. When multiple RUs are allocated to a single user, the foregoing designed interleaving solution needs to have excellent performance, and be easy to implement.

Figure 11:
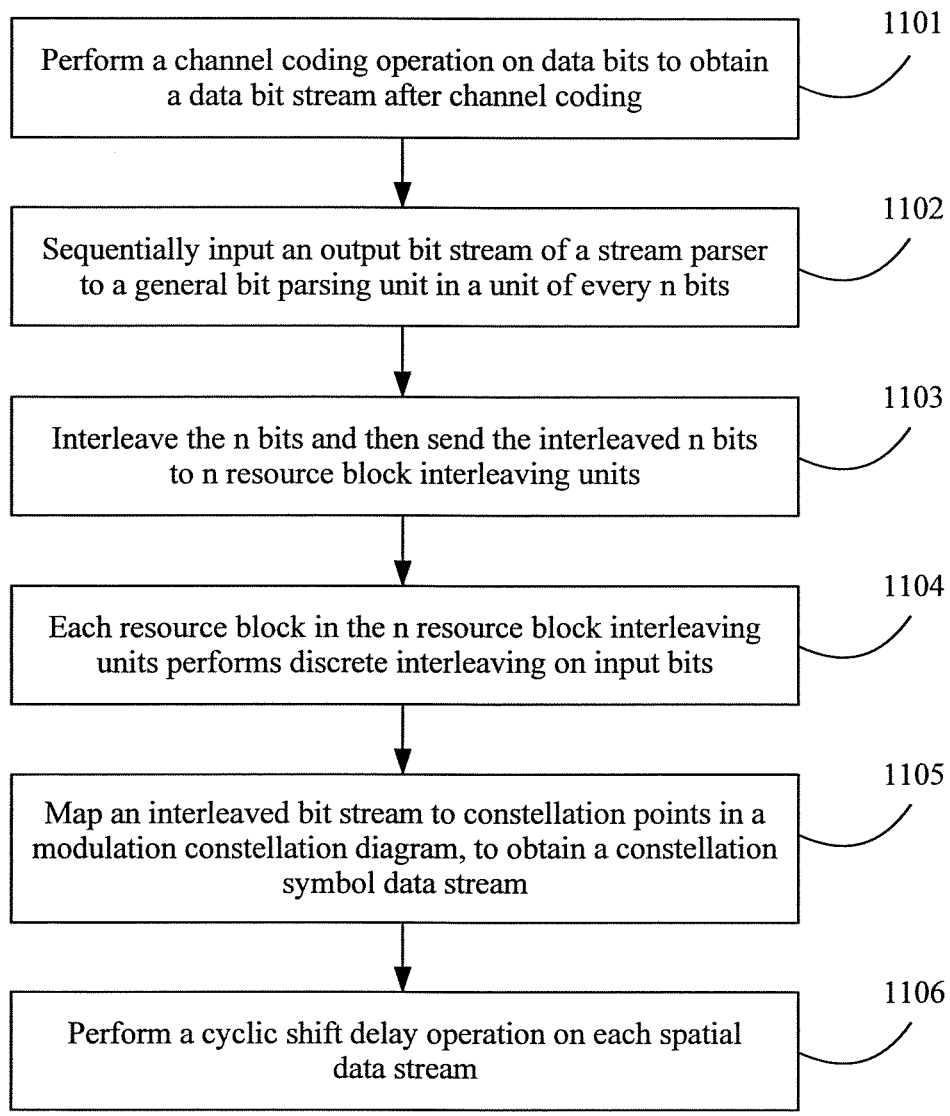
FIG. 11 is a flowchart of a third implementation manner of an interleaving processing method in a WLAN system according to the present disclosure.
Figure 12:
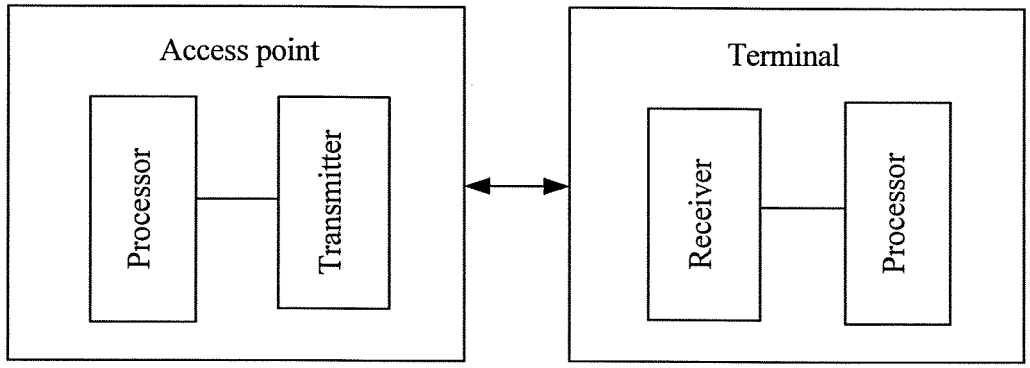
FIG. 12 is a schematic architectural view of another embodiment of a WLAN system according to the present disclosure.

For an OFDMA-based system, it is assumed that n RUs are simultaneously allocated to a same user. To resolve the foregoing problem, FIG. 11 is a schematic flowchart of a third implementation manner of an interleaving method for a WLAN device according to the present disclosure. As shown in FIG. 11, a difference from the second implementation manner of the interleaving method for the WLAN device in the embodiment of the present disclosure in FIG. 10 is as follows:

In step 1102, an output bit stream of a stream parser is sequentially input to a general bit parsing unit in a unit of every n bits. In step 1103, the n bits are interleaved and then sent to n resource block interleaving units. A processing procedure of the n resource block interleaving units in step 1104 is the same as that described in the foregoing solution 1. Step 1103 may be performed by the general bit parsing unit or a processor.

Assuming that four RUs are simultaneously allocated to a single user, a bit parsing unit sequentially inputs the output bit stream of the stream parser to the general bit parsing unit in a unit of every 8 bits. For example, output bits of the bit parsing unit are (0, 1, 2, 3, 4, 5, 6, 7) from top to bottom according to FIG. 9, and a sequence of output bits after the general bit parsing unit performs interleaving according to a row-column interleaver shown in the foregoing Table 9 is (0, 2, 4, 6, 1, 3, 5, 7) from top to bottom. The 8 bits are written into each resource block, and then the 8 bits are read. The foregoing process is repeated until each resource block is filled.

In the foregoing embodiment, in an OFMDA-based WLAN system, the foregoing system architecture is used, so that a problem that a bit interleaver cannot be reused is resolved, and in addition, an interleaver based on this design has a more flexible length. When multiple RUs are allocated to a single user, the foregoing designed interleaving solution needs to have excellent performance, and be easy to implement.

The WLAN device in the foregoing embodiment may be a base station, a user terminal, or a processor or a chip that executes the foregoing method. The method in the foregoing embodiment may be executed by software in addition to a physical apparatus.

Figure 13:
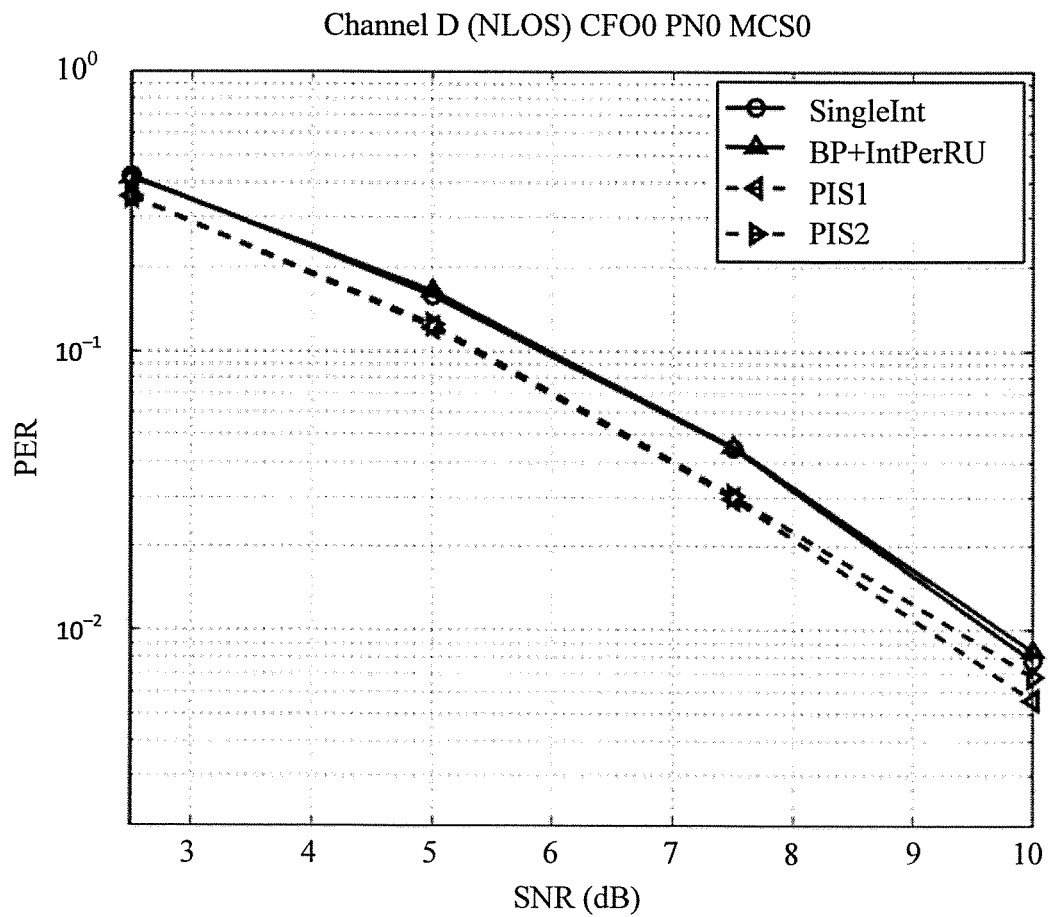
FIG. 13 is a schematic diagram of comparison among performance of four interleaving solutions when coding and modulation is MCS0 for a Channel D NLOS channel.

An embodiment of the present disclosure provides a schematic diagram of another WLAN device, as shown in FIG. 13. The WLAN device includes an access point (Access point, AP) and a terminal. The access point includes a transmitter and a processor 1. The terminal includes a receiver and a processor 2. The processor 1 may execute functions of all specific embodiments in FIG. 4 to FIG. 8. Likewise, the processor 2 performs corresponding processing according to processing by the processor 1. This is described in detail in the foregoing embodiment. Details are not described herein.

To better present an effect of the design of the present disclosure, the following obtains, by means of comparison, advantages of the design of the present disclosure in a simulation manner. In an example, a bandwidth of an OFMDA system is 20 M, and an FFT size is 256 points. The 20-M bandwidth is divided into eight RUs, each RU includes 24 data subcarriers and two pilot subcarriers, and the eight RUs are all allocated to a same user simultaneously. It is assumed that SingleInt represents an interleaving solution in the prior art, where parameters of the bit interleaver are $(N_{Row}, N_{COL})=(8m, 24)$; BP+IntPerRU represents an interleaving solution in the prior art, where parameters of a bit interleaver 1 of a level-2 processing unit in the interleaving solution are $(N_{Row}, N_{COL})=(3m, 8)$; and PIS1 and PIS2 are respectively the second implementation manner and the third implementation manner of the present disclosure. When different quantities of RUs are allocated to a user, adjustment to a module parameter required by the interleaving solution in the present disclosure is quite simple, and therefore, hardware implementation complexity is quite low. FIG. 13 shows comparison among performance of four interleaving solutions when coding and modulation is MCS0 for a Channel D NLOS channel.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions in the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the present disclosure essentially, or the part contributing to the prior art, or all or some of the technical solutions may be implemented in the form of a software product. The software product is stored in a storage medium and includes instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An interleaving processing apparatus in an OFMDA-based WLAN system, the apparatus comprising:
a bit parsing unit, configured to allocate bits in a coded data stream to n sub resource block interleaving units according to a specific sequence, wherein n is a positive integer greater than 1, and a value of n is a quantity of resource blocks allocated to a user;
wherein the n sub resource block interleaving units are configured to perform discrete interleaving on input bits; and
a general bit parsing unit located between the bit parsing unit and the n sub resource block interleaving units, wherein an output bit stream of the bit parsing unit is sequentially input to the general bit parsing unit in a unit of every r bits, and wherein the general bit parsing unit is configured to interleave the r bits and then allocate the r interleaved bits to the n sub resource block interleaving units according to a sequence, wherein r is a positive integer.

2. The apparatus according to claim 1, wherein the bit parsing unit is configured to sequentially or alternately allocate every s bits in the coded bit stream to the n sub resource block interleaving units, wherein s is a positive integer greater than 0.

3. The apparatus according to claim 1, further comprising:
a general resource block interleaving unit located between the n sub resource block interleaving units and a constellation mapper;
wherein each of the n sub resource block interleaving units is configured to perform discrete interleaving on input bits and then output the discretely-interleaved input bits to the general resource block interleaving unit; and
the general resource block interleaving unit is configured to perform discrete interleaving on at least two of the n sub resource block interleaving units.

4. The apparatus according to claim 3, wherein the general resource block interleaving unit is configured to:

interleave each of n bit interleavers in the n sub resource block interleaving units according to a preset list; or
interleave each of the n bit interleavers in the n sub resource block interleaving units in a row-column manner.

5. The apparatus according to claim 1, wherein:
each of the n sub resource block interleaving units is configured to perform the discrete interleaving on the input bits, and each sub resource block interleaving unit that has performed the discrete interleaving performs serial output according to a specific sequence or performs parallel output.

6. An interleaving processing apparatus in an OFMDA-based WLAN system, the apparatus comprising:
a bit parsing unit, configured to allocate bits in a coded data stream to n sub resource block interleaving units according to a specific sequence, wherein n is a positive integer greater than 1, and a value of n is a quantity of resource blocks allocated to a user;
wherein the n sub resource block interleaving units are configured to perform discrete interleaving on input bits;
wherein the bit parsing unit is configured to sequentially or alternately allocate every s bits in the coded bit stream to the n sub resource block interleaving units, wherein s is a positive integer greater than 0;
wherein:
when s is 1, a sequence number of a bit allocated to an $i_{RU}{}^{th}$ RU is j, and a correspondence between j and $i_{RU}$ is:

$j=(i_{RU}-1)+n \cdot k$; or when s is greater than 1, a sequence number of a bit allocated to an $i_{RU}{}^{th}$ RU is j, and a correspondence between j and $i_{RU}$ is $$j = (i_{RU} - 1) \cdot s + s \cdot n \cdot \left\lfloor \frac{k}{s} \right\rfloor + k \bmod s,$$

wherein
k represents a sequence number of a bit in each resource block interleaving unit, k is a non-negative integer, and s represents a quantity of bits consecutively allocated to each resource block interleaving unit.

7. An interleaving processing apparatus in an OFMDA-based WLAN system, the apparatus comprising:
a bit parsing unit, configured to allocate bits in a coded data stream to n sub resource block interleaving units according to a specific sequence, wherein n is a positive integer greater than 1, and a value of n is a quantity of resource blocks allocated to a user;
wherein the n sub resource block interleaving units are configured to perform discrete interleaving on input bits;
a general resource block interleaving unit located between the n sub resource block interleaving units and a constellation mapper;
wherein:
each of the n sub resource block interleaving units is configured to perform discrete interleaving on input bits and then output the discretely-interleaved input bits to the general resource block interleaving unit;
the general resource block interleaving unit is configured to perform discrete interleaving on at least two of the n sub resource block interleaving units;

each sub resource block interleaving unit is configured to input the input bits by row and then output the input bits by column; and/or each sub resource block interleaving unit is configured to perform cyclic shift on bits in each sub resource block interleaving unit according to a sequence of the sub resource block interleaving units.

8. The apparatus according to claim 7, wherein:
each sub resource block interleaving unit is configured to alternately map the bits output by column to a least significant bit and a most significant bit in a constellation diagram.

9. The apparatus according to claim 8, wherein:
when each sub resource block interleaving unit is configured to perform the right cyclic shift by s bits on the bits in each sub resource block interleaving unit according to the RU sequence, a correspondence between an input bit and an output bit j of the $i_{RU}{}^{th}$ RU is:

$$j = s \cdot \left\lfloor \frac{k}{s} \right\rfloor + (k - (i_{RU} - 1) + n \cdot m) \bmod s;$$

or
when each sub resource block interleaving unit is configured to perform the left cyclic shift by s bits on the bits in each sub resource block interleaving unit according to the RU sequence, a correspondence between an input bit and an output bit j of the $i_{RU}{}^{th}$ RU is:

$$j = s \cdot \left\lfloor \frac{k}{s} \right\rfloor + (k + (i_{RU} - 1)) \bmod s,$$

wherein
$1 \leq i_{RU} \leq n$, k=0, 1, . . . , n is a quantity of RUs allocated to the user, m is a modulation order, k is a bit location sequence number in the $i_{RU}{}^{th}$ RU before I/Q interleaving, and j is a bit location sequence number in the $i_{RU}{}^{th}$ RU after the I/Q interleaving.

10. The apparatus according to claim 7, wherein:
each sub resource block interleaving unit is configured to perform right or left cyclic shift by s bits on the bits in each sub resource block interleaving unit according to an RU sequence.

11. An interleaving processing apparatus in an OFMDA-based WLAN system, the apparatus comprising:
a bit parsing unit, configured to allocate bits in a coded data stream to n sub resource block interleaving units according to a specific sequence, wherein n is a positive integer greater than 1, and a value of n is a quantity of resource blocks allocated to a user;

wherein the n sub resource block interleaving units are configured to perform discrete interleaving on input bits;

a general resource block interleaving unit located between the n sub resource block interleaving units and a constellation mapper, wherein the general resource block interleaving unit is configured to:
interleave each of n bit interleavers in the n sub resource block interleaving units according to a preset list; or
interleave each of the n bit interleavers in the n sub resource block interleaving units in a row-column manner;

wherein:
each of the n sub resource block interleaving units is configured to perform discrete interleaving on input bits and then output the discretely-interleaved input bits to the general resource block interleaving unit;
the general resource block interleaving unit is configured to perform discrete interleaving on at least two of the n sub resource block interleaving units;
each sub resource block interleaving unit is configured to input the input bits by row and then output the input bits by column; and/or
each sub resource block interleaving unit is configured to perform cyclic shift on bits in each sub resource block interleaving unit according to a sequence of the sub resource block interleaving units;
wherein:
when n is an odd number, the general resource block interleaving unit is configured to fill a last location unit.

12. An interleaving processing method in an OFMDA-based WLAN system, the method comprising:
allocating, by a bit parsing unit, bits in a coded data stream to n sub resource block interleaving units according to a specific sequence, wherein n is a positive integer greater than 1, and a value of n is a quantity of resource blocks allocated to a user;
performing, by the sub resource block interleaving units, discrete interleaving on input bits;
sequentially inputting an output bit stream of the bit parsing unit to a general bit parsing unit in a unit of every r bits; and
interleaving, by the general bit parsing unit, the r bits, and then allocating the r interleaved bits to the n sub resource block interleaving units according to a specific sequence, wherein r is a positive integer.

13. The method according to claim 12, further comprising:
sequentially or alternately allocating, by the bit parsing unit, every s bits in the coded bit stream to the n sub resource block interleaving units, wherein s is a positive integer greater than 0.

14. The method according to claim 12, further comprising:
performing, by each of the n sub resource block interleaving units, discrete interleaving on input bits, and then outputting the discretely-interleaved input bits to a general resource block interleaving unit in parallel; and
performing, by the general resource block interleaving unit, discrete interleaving on at least two of the n sub resource block interleaving units.

15. The method according to claim 12, wherein performing, by the n resource block interleaving units, discrete interleaving on input bits comprises:
performing, by each of the n sub resource block interleaving units, the discrete interleaving on the input bits; and
performing, by each sub resource block interleaving unit that has performed the discrete interleaving, serial output according to a specific sequence or discrete interleaving, parallel output.

16. An interleaving processing method in an OFMDA-based WLAN system, the method comprising:
allocating, by a bit parsing unit, bits in a coded data stream to n sub resource block interleaving units according to a specific sequence, wherein n is a positive integer greater than 1, and a value of n is a quantity of resource blocks allocated to a user;
performing, by the sub resource block interleaving units, discrete interleaving on input bits;

sequentially or alternately allocating, by the bit parsing unit, every s bits in the coded bit stream to the n sub resource block interleaving units, wherein s is a positive integer greater than 0;

wherein:

when s is 1, a sequence number of a bit allocated to an $i_{RU}{}^{th}$ RU is j, and a correspondence between j and $i_{RU}$ is:

$j=(i_{RU}-1)+n \cdot k$; or when s is greater than 1, a sequence number of a bit allocated to an $i_{RU}{}^{th}$ RU is j, and a correspondence between j and $i_{RU}$ is $$j = (i_{RU} - 1) \cdot s + s \cdot n \cdot \left\lfloor \frac{k}{s} \right\rfloor + k \bmod s,$$

wherein k represents a sequence number of a bit in each resource block interleaving unit, k is a non-negative integer, and s represents a quantity of bits consecutively allocated to each resource block interleaving unit.

17. An interleaving processing method in an OFMDA-based WLAN system, the method comprising:

allocating, by a bit parsing unit, bits in a coded data stream to n sub resource block interleaving units according to a specific sequence, wherein n is a positive integer greater than 1, and a value of n is a quantity of resource blocks allocated to a user;

performing, by the sub resource block interleaving units, discrete interleaving on input bits;

performing, by each of the n sub resource block interleaving units, discrete interleaving on input bits, and then outputting the discretely-interleaved input bits to a general resource block interleaving unit in parallel;

performing, by the general resource block interleaving unit, discrete interleaving on at least two of the n sub resource block interleaving units; and wherein performing, by each sub resource block interleaving unit, the discrete interleaving on input bits comprises:

inputting, by each sub resource block interleaving unit, the input bits by row, and then outputting the input bits by column; and/or performing, by each sub resource block interleaving unit, cyclic shift on bits in each sub resource block interleaving unit according to a sequence of the sub resource block interleaving units.

18. The method according to claim 17, wherein inputting, by each sub resource block interleaving unit, the input bits by row, and then outputting the input bits by column further comprises:

alternately mapping, by each sub resource block interleaving unit, the bits output by column to a least significant bit and a most significant bit in a constellation diagram.

* * * * *